(12) United States Patent
Liberato et al.

(10) Patent No.: US 12,540,863 B2
(45) Date of Patent: Feb. 3, 2026

(54) CAPACITANCE-BASED TEMPERATURE SENSOR WITH DELAY

(71) Applicant: Temptime Corporation, Morris Plains, NJ (US)

(72) Inventors: Eric W. Liberato, Pequannock, NJ (US); Mohannad Abdo, Clifton, NJ (US)

(73) Assignee: ZEBRA TECHNOLOGIES CORPORATION, Lincolnshire, IL (US)

(*) Notice: Subject to any disclaimer, the term of this patent is extended or adjusted under 35 U.S.C. 154(b) by 795 days.

(21) Appl. No.: 17/867,042

(22) Filed: Jul. 18, 2022

(65) Prior Publication Data

US 2024/0019316 A1    Jan. 18, 2024

(51) Int. Cl.
| | | |
|---|---|---|
| *G01K 11/06* | (2006.01) | |
| *G01K 1/024* | (2021.01) | |
| *G01K 7/34* | (2006.01) | |
| *G01K 11/12* | (2021.01) | |
| *G06K 19/07* | (2006.01) | |

(52) U.S. Cl.
CPC ............... *G01K 7/34* (2013.01); *G01K 1/024* (2013.01); *G01K 11/06* (2013.01); *G06K 19/0723* (2013.01)

(58) Field of Classification Search
CPC .......... G01K 7/34; G01K 1/024; G01K 11/06; G01K 1/02; G01K 3/04; G01K 3/10; G01K 1/00; G01K 3/00; G01K 7/00; G01K 11/00
USPC ........... 116/216, 217, 219; 374/44, 101–104, 374/106, 108, 159, 160
See application file for complete search history.

(56) References Cited

U.S. PATENT DOCUMENTS

| | | |
|---|---|---|
| 3,065,083 A | 11/1962 | Gessler |
| 3,420,205 A | 1/1969 | Morison |
| 3,999,946 A | 12/1976 | Patel et al. |
| 4,050,945 A | 9/1977 | Suzuki |

(Continued)

FOREIGN PATENT DOCUMENTS

| | | |
|---|---|---|
| CN | 103543146 | 1/2014 |
| CN | 104599956 | 5/2015 |

(Continued)

OTHER PUBLICATIONS

Bhattacharyya et al., "Low-Cost, Ubiquitous RFID-Tag-Antenna-Based Sensing", Proceedings of the IEEE 2010, 98, 1593-1600.

(Continued)

*Primary Examiner* — John E Breene
*Assistant Examiner* — Manuel Salvador Castellon, Jr.
(74) *Attorney, Agent, or Firm* — K&L Gates LLP

(57) ABSTRACT

A temperature exposure indicator includes a first temperature responsive material, a capacitor including a first electrode, a second electrode, and a gap between the first electrode and the second electrode, and a first path connecting the first temperature responsive material to the gap. The first temperature responsive material is configured to migrate along the first path and into or along the gap in response to exposure to a temperature above a first threshold temperature. The migration of the first temperature responsive material into or along the gap causes a change of the capacitance of the capacitor.

26 Claims, 19 Drawing Sheets

(56) References Cited

U.S. PATENT DOCUMENTS

| | | |
|---|---|---|
| 4,189,399 A | 2/1980 | Patel |
| 4,384,980 A | 5/1983 | Patel |
| 4,428,321 A | 1/1984 | Arens |
| 4,487,057 A | 12/1984 | Lutz |
| 4,646,066 A | 2/1987 | Baughman et al. |
| 4,788,151 A | 11/1988 | Preziosi et al. |
| 4,789,637 A | 12/1988 | Preziosi et al. |
| 4,830,855 A | 5/1989 | Stewart |
| 4,931,420 A | 6/1990 | Asano et al. |
| 5,045,283 A | 9/1991 | Patel |
| 5,053,339 A | 10/1991 | Patel |
| 5,057,434 A | 10/1991 | Prusik et al. |
| 5,120,349 A | 6/1992 | Stewart et al. |
| 5,152,611 A | 10/1992 | Pieper et al. |
| 5,156,911 A | 10/1992 | Stewart |
| 5,254,473 A | 10/1993 | Patel |
| 5,368,905 A | 11/1994 | Ohno |
| 5,602,804 A | 2/1997 | Haas |
| 5,622,137 A * | 4/1997 | Lupton, Jr. ............ G01K 11/16 374/155 |
| 5,667,303 A | 9/1997 | Arens et al. |
| 5,686,153 A | 11/1997 | Heynderickx et al. |
| 5,709,472 A | 1/1998 | Prusik et al. |
| 5,783,302 A | 7/1998 | Billel et al. |
| 5,964,181 A | 10/1999 | Pereyra et al. |
| 5,997,927 A | 12/1999 | Gics |
| 6,042,264 A | 3/2000 | Prusik et al. |
| 6,524,697 B1 | 2/2003 | Furuyama et al. |
| 6,544,925 B1 | 4/2003 | Prusik et al. |
| 6,602,594 B2 | 8/2003 | Miyata et al. |
| 6,614,728 B2 | 9/2003 | Spevacek |
| 6,642,016 B1 | 11/2003 | Sjoholm et al. |
| 6,720,866 B1 | 4/2004 | Sorrells et al. |
| 6,741,523 B1 | 5/2004 | Bommarito |
| 6,916,116 B2 | 7/2005 | Deikmann et al. |
| 6,924,148 B2 | 8/2005 | Prusik |
| 6,957,623 B2 | 10/2005 | Guisinger et al. |
| 7,019,172 B2 | 3/2006 | Joshi et al. |
| 7,098,794 B2 | 8/2006 | Lindsay et al. |
| 7,161,023 B2 | 1/2007 | Prusik et al. |
| 7,209,042 B2 | 4/2007 | Martin et al. |
| 7,232,253 B2 | 6/2007 | Isbitsky et al. |
| 7,290,925 B1 | 11/2007 | Skjervold |
| 7,490,575 B2 | 2/2009 | Taylor et al. |
| 7,503,690 B2 | 3/2009 | Song et al. |
| 7,517,146 B2 | 4/2009 | Smith et al. |
| 7,570,169 B2 | 8/2009 | Li et al. |
| 7,604,398 B1 | 10/2009 | Akers et al. |
| 7,682,830 B2 | 3/2010 | Prusik et al. |
| 7,719,404 B2 | 5/2010 | Makela et al. |
| 7,940,605 B2 | 5/2011 | Rel et al. |
| 8,040,243 B2 | 10/2011 | Bommer et al. |
| 8,043,000 B2 | 10/2011 | Sumida et al. |
| 8,061,294 B2 | 11/2011 | Suda et al. |
| 8,067,483 B2 | 11/2011 | Prusik et al. |
| 8,111,143 B2 | 2/2012 | Tong et al. |
| 8,122,844 B2 | 2/2012 | Smith et al. |
| 8,142,072 B2 | 3/2012 | Kinami |
| 8,228,172 B2 | 7/2012 | Collins et al. |
| 8,267,576 B2 | 9/2012 | Haarer et al. |
| 8,395,521 B2 | 3/2013 | Kauffman et al. |
| 8,562,208 B2 | 10/2013 | Yeager et al. |
| 8,671,871 B2 | 3/2014 | Huffman et al. |
| 8,695,528 B2 | 4/2014 | Boyaci et al. |
| 8,707,887 B2 | 4/2014 | Suda et al. |
| 8,870,082 B2 | 10/2014 | Cattaneo et al. |
| 8,899,829 B1 | 12/2014 | Butera et al. |
| 8,911,861 B2 | 12/2014 | Parker |
| 8,968,662 B2 | 3/2015 | Haarer et al. |
| 9,011,794 B2 | 4/2015 | Haarer et al. |
| 9,182,292 B2 | 11/2015 | Rel et al. |
| 9,195,925 B2 | 11/2015 | Potyrailo et al. |
| 9,234,806 B2 | 1/2016 | Hoon et al. |
| 9,348,318 B2 | 5/2016 | Hong et al. |
| 9,410,852 B2 | 8/2016 | Park et al. |
| 9,436,853 B1 | 9/2016 | Meyers |
| 9,448,182 B2 | 9/2016 | Haarer et al. |
| 9,546,911 B2 | 1/2017 | Huffman et al. |
| 10,184,777 B2 | 1/2019 | Okojie |
| 10,338,537 B2 | 7/2019 | Braunberger |
| 10,451,595 B2 | 10/2019 | Patel et al. |
| 10,514,340 B2 | 12/2019 | Prusik et al. |
| 11,241,902 B1 | 2/2022 | Smith et al. |
| 2003/0053377 A1 | 3/2003 | Spevacek |
| 2004/0061655 A1 | 4/2004 | Forster et al. |
| 2005/0211153 A1 | 9/2005 | Ribi et al. |
| 2006/0261946 A1 | 11/2006 | Himberger et al. |
| 2007/0076779 A1 | 4/2007 | Haarer |
| 2007/0210923 A1 | 9/2007 | Butler et al. |
| 2008/0012580 A1 | 1/2008 | Funo et al. |
| 2008/0056329 A1 | 3/2008 | Smith et al. |
| 2008/0259992 A1 | 10/2008 | Sumida et al. |
| 2008/0269050 A1 | 10/2008 | Azizian et al. |
| 2008/0292507 A1 | 11/2008 | Dee et al. |
| 2009/0010304 A1 | 1/2009 | Skinner et al. |
| 2009/0044744 A1 | 2/2009 | Koene et al. |
| 2009/0050049 A1 | 2/2009 | Craig et al. |
| 2009/0066516 A1 | 3/2009 | Lazo |
| 2009/0092519 A1 | 4/2009 | Stewart et al. |
| 2009/0131718 A1 | 5/2009 | Baughman et al. |
| 2010/0001745 A1 | 1/2010 | Sumida et al. |
| 2010/0090802 A1 | 4/2010 | Nilsson et al. |
| 2010/0123583 A1 | 5/2010 | Bommer et al. |
| 2011/0080763 A1 | 4/2011 | Siau et al. |
| 2011/0211612 A1 | 9/2011 | Branecky |
| 2012/0027045 A1 | 2/2012 | Joseph et al. |
| 2012/0079981 A1 | 4/2012 | Huffman et al. |
| 2012/0260728 A1 | 10/2012 | Bhattacharyya et al. |
| 2013/0033364 A1 | 2/2013 | Raz et al. |
| 2013/0220209 A1 | 8/2013 | Rabinowitz et al. |
| 2013/0224875 A1 | 8/2013 | Haarer et al. |
| 2013/0239874 A1 | 9/2013 | Smith et al. |
| 2013/0287059 A1 | 10/2013 | Selman et al. |
| 2013/0305980 A1 | 11/2013 | Park et al. |
| 2014/0044609 A1 | 2/2014 | Prusik et al. |
| 2014/0119402 A1 | 5/2014 | Zongwu et al. |
| 2014/0144366 A1 | 5/2014 | Huffman et al. |
| 2014/0148095 A1 | 5/2014 | Smith et al. |
| 2014/0154808 A1 | 6/2014 | Patel |
| 2014/0211827 A1 | 7/2014 | Rohr et al. |
| 2014/0358099 A1 | 12/2014 | Durgin et al. |
| 2016/0069812 A1 | 3/2016 | Prusik et al. |
| 2017/0211992 A1 | 7/2017 | Yeager et al. |
| 2017/0255854 A1 | 9/2017 | Bhatia et al. |
| 2017/0370692 A1 | 12/2017 | Okojie |
| 2019/0212210 A1 | 7/2019 | Johnston et al. |
| 2019/0236425 A1 * | 8/2019 | Fonk ..................... G01K 1/024 |
| 2019/0346415 A1 | 11/2019 | Abdo et al. |
| 2022/0178761 A1 | 6/2022 | Huffman et al. |
| 2022/0268640 A1 | 8/2022 | Bhatia et al. |

FOREIGN PATENT DOCUMENTS

| | | |
|---|---|---|
| DE | 69817138 | 6/2004 |
| DE | 10 2005 061249 | 6/2007 |
| GB | 2430257 | 3/2007 |
| GB | 2601221 | 5/2022 |
| JP | 2000351951 | 12/2000 |
| JP | 2008260147 | 10/2008 |
| JP | 5723474 | 5/2015 |
| KR | 20040077342 | 9/2004 |
| KR | 101519317 | 5/2015 |
| WO | WO 8301834 | 5/1983 |
| WO | WO 9934221 | 7/1999 |
| WO | WO 2005040300 | 5/2000 |
| WO | WO03/044521 | 5/2003 |
| WO | WO 2004039683 | 5/2004 |
| WO | WO 2005/075978 | 8/2005 |
| WO | WO 20080127044 | 10/2008 |
| WO | WO 2010/068279 | 6/2010 |
| WO | WO 2012176881 | 12/2012 |
| WO | WO 2013170273 | 11/2013 |
| WO | WO2014113247 | 10/2014 |
| WO | WO2015113086 | 8/2015 |

(56) References Cited

FOREIGN PATENT DOCUMENTS

| WO | WO2016160912 | A1 | | 10/2016 | |
|---|---|---|---|---|---|
| WO | WO2016160912 | A4 | | 10/2016 | |
| WO | WO2017151731 | | | 9/2017 | |
| WO | WO-2018039727 | A1 | * | 3/2018 | ............ B65D 79/02 |
| WO | WO2020231921 | | | 11/2020 | |
| WO | 2021149087 | A1 | | 7/2021 | |

OTHER PUBLICATIONS

Windl et al., "Reactivatable Passive Radio-Frequency Identification Temperature Indicator", Journal of Applied Physics 117, 17C125 (2015).
Tanguy et al. "Enhanced Radio Frequency Biosensor for Food Quality Detection Using Functionalized Carbon Nanofillers", ACS Appl. Mater. Interfaces 2015, 7, 11939-11947.
Wu et al., "3D-Printed Microelectronics for Integrated Circuitry and Passive Wireless Sensors", Microsystems & Nanoengineering 1, 15013 (2015).
Wan et al., "A New Type of TTI Based on Electrochemical Pseudo Transistor", J. of Food. Engin. 168, (2016) 79-83.
Search Report and Written Opinion dated Jul. 17, 2017 issued for International PCT Application No. PCT/US17/20142.
Office Action dated Sep. 19, 2019 issued for European Patent Application No. 17760694.4.
International search report and of a written opinion dated Aug. 10, 2020 issued for International PCT Application No. PCT/US20/32340.
Office Action dated Sep. 3, 2020 issued for European Patent Application No. 17760694.4.
Office Action dated Jan. 7, 2020 issued for European Patent Application No. 17760694.4.
The International Search Report dated Jan. 18, 2012 for PCT Application No. PCT/US11/53416.
Dow Polyethylene—CARBOWAX PEGs, downloaded on Mar. 9, 2012 from http://www.dow.com/polyglycols/polyethylene/products/carbowaxp.htm and list of products.
Search Report and Written Opinion dated Jul. 25, 2019 issued for International PCT Application No. PCT/US19/31766.
Office Action dated Sep. 23, 2019 issued for European Patent Application No. 17760694.4.
Office Action dated Nov. 4, 2020 Issued for Chinese Patent Application No. 201780014268.2.
Office Action dated Feb. 25, 2021 issued for Korean Patent Application No. 10-2018-7026541.
Search Report and Written Opinion dated Jul. 7, 2022 issued for International PCT Application No. PCT/US22/17138 filed on Feb. 21, 2022.
Gascon, et al., "Formation of Gold Nanoparticles in a Side-Chain Liquid Crystalline Network: Influence of the Structure and Macroscopic Order of the Material", 2005, Chem. Mat.
Combined Search and Examination Report dated Jun. 7, 2022 issued for United Kingdom Patent Application No. GB2117606.0.
Office Action dated Aug. 22, 2022 issued for Belgian Patent Application No. 2021/5946.
O'Leary et al. "Copolymers of poly(n-alkyl acrylates); synthesis, characterization, and monomer reactivity ratios", Polymer 2004 45 pp. 6575-6585.
Greenberg et al. "Side Chain Crystallization of n-Alkyl Polymethacrylates and Polyacrylates" J. Am. Chem. Soc., 1954, 76 (24), pp. 6280-6285.
S.H. Lee et al., Viscosity and Diffusion Constants Calculation of n-Alkanes by Molecular Dynamics Simulations, Bull. Korean Chem. Soc., 2003, vol. 24, No. 11, pp. 1590-1598.
Search Report and Written Opinion dated Nov. 2, 2023 issued for International PCT Application No. PCT/US2023/027940.

* cited by examiner

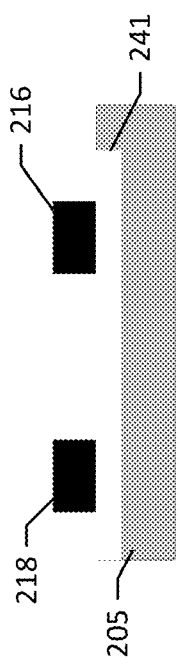

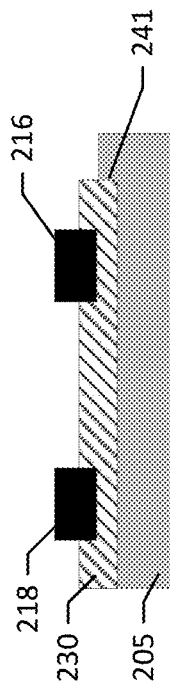
FIG. 8A
FIG. 8B
FIG. 8C

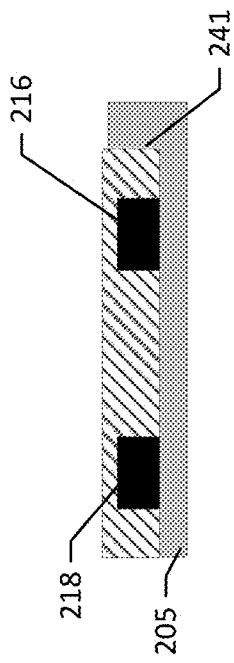
FIG. 12A
FIG. 12B
FIG. 12C

CAPACITANCE-BASED TEMPERATURE SENSOR WITH DELAY

BACKGROUND

Many commercial products are sensitive to temperature conditions, such as freezing, thawing, high or low temperatures, and/or extended periods of time at an elevated temperature, and they may lose efficacy or quality under any of these conditions. Examples of temperature-sensitive commercial products include certain pharmaceuticals, medical products, and foodstuffs, as well as some industrial products. There is a continued need for an environmental temperature indicator to detect such changes. It is desirable for some products, which can survive a short exposure to high temperature excursion, to detect when a high temperature excursion of longer than a certain time period has occurred.

SUMMARY

The present disclosure provides new and innovative temperature indicators and systems for providing an indication of exposure to temperature changes. In some examples, a temperature indicator may include a first temperature responsive material; a capacitor including a first electrode, a second electrode, and a gap between the first electrode and the second electrode; and a first path connecting the first temperature responsive material to the gap. The first temperature responsive material is configured to migrate along the first path and into or along the gap in response to exposure to a temperature above a first threshold temperature. The migration of the first temperature responsive material into or along the gap causes a change of the capacitance of the capacitor.

In some examples, a temperature indicator may include a first temperature responsive material; a capacitor including a first electrode, a second electrode, and a gap between the first electrode and the second electrode; and a first path. The first temperature responsive material may be configured to migrate along the first path and away from the gap in response to exposure to a temperature above a first threshold temperature. The migration of the first temperature responsive material away from the gap may cause a change of the capacitance of the capacitor.

Additional features and advantages of the disclosed systems are described in, and will be apparent from, the following Detailed Description and the Figures.

BRIEF DESCRIPTION OF THE FIGURES

FIGS. 6A, 6B, and 6C are various examples of a cross-sectional view of the temperature indicator of FIG. 5 along the line of B-B.

FIGS. 8A, 8B, and 8C are various examples of a cross-sectional view of the temperature indicator of FIG. 7 along the line of B-B after the temperature indicator is exposed to a temperature above a threshold temperature.

FIGS. 12A, 12B, and 12C are various examples of a cross-sectional view of the temperature indicator of FIG. 11 along the line of B-B after the temperature indicator is exposed to a temperature above a threshold temperature.

DETAILED DESCRIPTION OF EXAMPLE EMBODIMENTS

Figure 1:
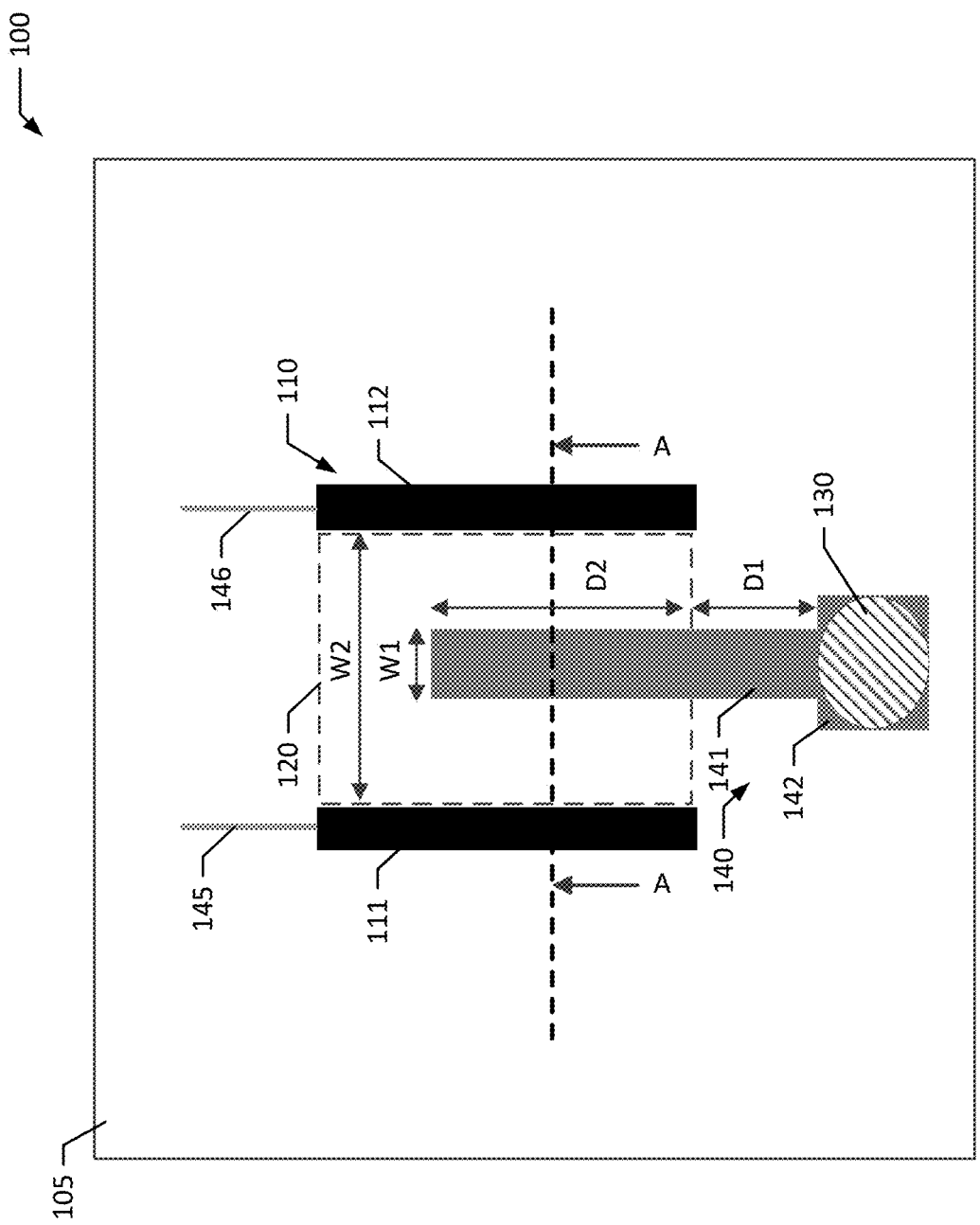
FIG. 1 is a diagram of a temperature indicator according to an example embodiment of the present disclosure.

Many vaccines, drugs, foodstuffs, and other products are temperature-sensitive, or perishable, and can lose quality with time at rates that are influenced by ambient temperatures. To help mitigate problems associated with undesirable temperature conditions, a temperature indicator can be associated with the vaccines, drugs, foodstuffs, or other host products that are thermally sensitive, to provide an alert to a health worker, or other end-user, that the products may have lost potency and possibly should not be used.

It may be desirable to have an indicator that reports historical temperature exposure, e.g., whether the temperature of the product has exceeded a threshold temperature, which may damage certain products. In other situations, it may be desirable to have an indicator that reports if a product is above, or has recently exceeded, a threshold temperature, somewhat analogous to a thermometer. These indicators may be provided in a variety of forms, e.g., optically readable indicators. In other cases, either alone or combination with such optical indicators, indicators that signal historical or current temperature with either an electrical signal or a radio signal, such as a signal provided by a RFID, may be provided. The implementation of such electrical or radio indicators may be facilitated by the use of capacitors or other electrical components that significantly change capacitance or other electrical property in response to temperature exposure above a threshold. In some cases, the response may be irreversible, i.e., the changed electrical property does not return to its original value after the threshold exposure ends.

In some examples, a temperature indicator according to the present disclosure may include a capacitive structure including two conductive plates separated by a dielectric layer capable of holding charge. The capacitance structure can be introduced to an RFID tag containing a chip capable of reading capacitance values of that structure.

The temperature indicator according to the present disclosure may also a mechanism to inhibit or delay the flow of a temperature responsive material, e.g., a wicking mechanism, a capillary tube, or other structure which requires a substantial amount of time for the indicator material to pass through. For example, a porous channel/wick can be formed on or in a substrate. A temperature responsive material (e.g., dielectric material) may be disposed at one end of this porous channel. In some examples, this temperature responsive material may be in its solid state and undergo an environmental dependent phase change (e.g., to liquid) when exposed to a temperature above a threshold temperature. When the temperature responsive material undergoes a phase change, for example, from solid to liquid, it may begin to move up the channel/wick. When the temperature responsive material comes into contact with the capacitive structure, a change in capacitance may be observed. When the phase change occurs and the temperature responsive material moves up the channel/wick, time will pass before the temperature responsive material can be moved into the capacitive structure, thereby having a timer ability.

In some examples, the temperature indicator according to the present disclosure may function as a multi-response indicator. For example, the temperature indicator may include multiple porous channels/wicks, and multiple temperature responsive materials may be disposed in each channel (e.g., at one end thereof). The temperature responsive material in each channel may undergo an environmental dependent phase change when exposed to a temperature above a threshold temperature and begin to move up the channel. The temperature responsive material in each channel may have a different threshold temperature, thereby detecting exposure to various temperature levels.

FIG. 1 depicts an example temperature indicator 100 in accordance with one or more aspects of the present disclosure. The temperature indicator 100 may include a capacitor 110 having a first electrode 111, a second electrode 112, and a gap 120 between the first electrode 111 and the second electrode 112. In some examples, the first electrode 111 may be connected to a first contact terminal 145, and the second electrode 112 may be connected to a second contact terminal 146. In some examples, the first electrode 111 and the second electrode 112 may be made with metal (e.g., copper, aluminum, silver, gold), graphite, conductive polymers, or any other suitable conducting materials.

In some examples, a substrate 105 may be provided, and the temperature indicator 100 may be disposed on or in the substrate 105. In some examples, the substrate 105 may be made with a paper (e.g., TTC paper, WHATMAN filter paper). In other examples, the substrate 105 may be made with any other suitable nonconductive material, any film with a microchannel, or any breathable film, such as cloth or plastic (e.g., polyester, polyethylene terephthalate (PET), polyvinyl chloride (PVC), polyvinyl acetate (PVAC), etc.). The substrate 105 may also be the surface of a package for a product to be monitored, e.g., incorporating the feature directly in a box or other packing container, or a label material, e.g., an adhesive-backed label that may be applied to a package or product.

In some examples, the temperature indicator 100 may further include a temperature responsive material 130 and a path 140 for the temperature responsive material 130. In some examples, the path 140 may include a holder portion 142 configured to hold the temperature responsive material 130 and a channel portion 141 along which the temperature responsive material 130 can migrate/diffuse into or along the gap 120. The path 140 may connect the temperature responsive material 130 to the gap 120.

In some examples, the holder portion 142 (and the temperature responsive material 130) may be disposed at one end of the path 140. In other examples, the holder portion 142 may be disposed at any other portion of the path 140 (e.g., in the middle portion of the channel portion 141). As shown in FIG. 1, the holder portion 142 (and the temperature responsive material 130) may be disposed at a predetermined distance D1 away from the capacitor 110/gap 120.

In some examples, the length D2 of the channel portion 141 that is disposed between the first electrode 111 and the second electrode 112 may be at least 50% of the length of the first/second electrode 111/112, for example, at least 60%, at least 70%, at least 80%, at least 90, or at least 100%. In other examples, the length D2 of the channel portion 141 that is disposed between the first electrode 111 and the second electrode 112 may be less than 50% of the length of the first/second electrode 111/112, for example, less than 40%, less than 30%, or less than 20%.

In some examples, the length D1 of the channel portion 141 that is disposed outside of the capacitor 110 may be at least 50% of the length of the first/second electrode 111/112, for example, at least 60%, at least 70%, at least 80%, at least 90, or at least 100%. In other examples, the length D2 of the channel portion 141 that is disposed between the first electrode 111 and the second electrode 112 may be less than 50% of the length of the first/second electrode 111/112, for example, less than 40%, less than 30%, or less than 20%.

In some examples, the length D1 or D2 of the channel portion 141 may be in a range of about 0.1 to 3 inches. In other examples, the length D1 or D2 of the channel portion 141 may have any other suitable value to provide the required amount of delay in the movement of the material from the holder portion to the gap (e.g., 0 to 0.5 inches or greater than 3 inches). In some examples, the thickness of the path 140 may be about 0.1 to about 0.5 mil, about 0.5 to about 1.5 mil, about 1.5 to about 5.0 mil, or about 5.0 to about 10.0 mil. In other examples, the path 140 may have any other suitable thickness. It will be appreciated that adjusting the length may allow tuning the delay required for the movement of material.

In some examples, the width W1 of the channel portion 141 (e.g., average width) that is disposed between the first electrode 111 and the second electrode 112 may be at least 20% of the width W2 of the capacitor (i.e., the distance between the first electrode 111 and the second electrode 112), for example, at least 30%, at least 40%, at least 50%, at least 60, at least 70%, at least 80%, at least 90%, or at least 100%. In other examples, the width W1 of the channel portion 141 (e.g., average width) that is disposed between the first electrode 111 and the second electrode 112 may be less than 20% of the width W2 of the capacitor, for example, less than 10%. It will be appreciated that adjusting the width may, in some cases, allow tuning the delay required for the movement of material.

In some examples, the width W1 of the channel portion 141 (e.g., average width) that is disposed between the first electrode 111 and the second electrode 112 may be in a range of about 0.1 to 1.5 inches. In other examples, the width W1 of the channel portion 141 (e.g., average width) that is disposed between the first electrode 111 and the second electrode 112 may have any other suitable value (e.g., less than 0.1 inches or greater than 1.5 inches). In some examples, the width W2 of the capacitor 110 may be in a range of about to 3 inches. In other examples, the width W2 of the capacitor 110 may have any other suitable value (e.g., less than 0.1 inches or greater than 3 inches).

In some examples, the temperature responsive material 130 may migrate along the path 140 (e.g., the channel portion 141) and into or along the gap 120 in response to exposure to a temperature above a threshold temperature. The migration of the temperature responsive material 130 into or along the gap 120 may cause a change of the capacitance of the capacitor 110. For example, as the temperature responsive material 130 is migrated into/along the gap 120, there may be a change in the dielectric constant of the gap portion 120 of the capacitor 110, thereby changing the capacitance of the capacitor 110/temperature indicator 100 (e.g., capacitance increased from 5 to 10 pF). When the temperature indicator 100 is associated with an RFID tag system, this may cause an integrated circuit of the RFID tag system to indicate the temperature change.

In some examples, when the path 140 (and the temperature responsive material 130 after exposure to the temperature above the threshold temperature) fills/covers only a portion of the gap 120, the remaining space in the gap 120 may be filled with other filler material or component, including air, silicon dioxide, or any other suitable nonconductive material. In some examples, the filler material or component may be stable (e.g., tend not to change its dielectric constant) in response to a temperature change. In some examples, the change in the dielectric constant of the filler material due to the temperature change may be minimal compared to the change in capacitance due to the migration of the temperature responsive material 130 into/along the gap 120. In some examples, the substrate 105 may be etched and the electrodes 111, 112 may be placed in the etched channels so that the substrate 105 itself can be used as the filler material.

The change in capacitance of the temperature indicator 100 may be irreversible. That is, once the capacitance has changed, the changed capacitance may persist after the temperature indicator 100 is no longer exposed to the temperature above the threshold temperature. After a change in capacitance and after a subsequent exposure to a temperature below the respective threshold temperature, the temperature indicator 100 may retain the changed capacitance or may not return to its initial capacitance value.

In some examples, at least a predetermined time period of exposure above the first threshold temperature is required for the migration of the first temperature responsive material to cause the change of the capacitance of the capacitor 110 after an initial exposure to the temperature above the threshold temperature. Hereinafter, the predetermined time period is also called as a "response time," and these terms will be used interchangeably throughout this application. As described above, the temperature responsive material 130 may be disposed at a predetermined distance D1 away from the capacitor 110 and may start migrating along the path 140 (e.g., the channel portion 141) toward the capacitor 110 when exposed to the temperature above the threshold temperature. Therefore, it may take time (e.g., the above-discussed predetermined time period) for the temperature responsive material 130 to migrate into/along the gap 120. In some examples, there may be no change of the capacitance of the capacitor 110 when the temperature indicator 100 is exposed to the temperature above the threshold temperature less than the predetermined time period.

In some cases, the change in capacitance value may occur after a relatively long time period of exposure of the temperature indicator 100 to a temperature above the threshold temperature. In such cases, the change in capacitance value may occur after exposure of the temperature indicator 100 for about 1 hour to about 72 hours to the temperature above the threshold temperature, such as for about 1 hour to about 2 hours, for about 2 hours to about 5 hours, for about 5 hours to about 10 hours, for about 10 hours to about 24 hours, for about 24 hours to about 48 hours, or for about 48 hours to about 72 hours. The predetermined time period may be also in this time range. With a long time to change property in response to an exposure to the temperature above the threshold, the temperature indicator 100 may be used as a time-temperature exposure indicator.

In some examples, the change in capacitance of the temperature indicator may occur after a relatively shorter time period of exposure to the temperature above the threshold temperature. In such cases, the change in capacitance can occur after exposure of the temperature indicator 100 for about 1 minute to about 2 minutes, for about 2 minutes to about 5 minutes, for about 5 minutes to about 10 minutes, for about 10 minutes to about 30 minutes, for about 30 minutes to about 1 hour. The change in capacitance can also occur after exposure of the temperature indicator 100 for about 1 minute or less to the temperature above the threshold temperature, such as for about 30 seconds or less, for about 20 seconds or less, for about 15 seconds or less, for about 10 seconds or less, for about 5 seconds or less, or for about 2 seconds or less. The predetermined time period may be also in this time range. The materials for the temperature responsive material 130 or the distance D1 of the channel portion 141 can be tuned, so that the threshold temperature and the response time can be tied to properties of a perishable product. Shorter time periods may be particularly suitable for detecting products that have warmed up above a temperature—for example if they have been removed from a refrigerator and risen above a maximum allowed temperature that is close to the controlled temperature in the refrigerator. They may also be useful for products that only require a relatively short exposure to high temperature in order to be rendered unfit.

In some examples, the threshold temperature can be about 55° C. to about about 57.5° C. to about 62.5° C., about 45° C. to about 55° C., about 42.5° C. to about 47.5° C., about 35° C. to about 45° C., about 25° C. to about 35° C., about 27.5° C. to about 32.5° C., about 10° C. to about 25° C., about 0° C. to about 10° C., about −10° C. to about 0° C., about 65° C. or less, about 60° C. or less, about 55° C. or less, about 50° C. or less, about 45° C. or less, about or less, about 35° C. or less, about 30° C. or less, about 25° C. or less, about 20° C. or less, about 15° C. or less, about 10° C. or less, about 0° C. or less, or about −10° C. or less. In other examples, the threshold temperature can have any other suitable range.

In some examples, for vaccines (e.g., yellow fever vaccines, hepatitis vaccines, HPV vaccines, rotavirus vaccines, pneumococcal vaccines, cholera vaccines, etc.) that need to be stored between 2° C. and 8° C., the threshold temperature can be about 8° C. In some examples, for medical supplies, diagnostics kits, and/or Controlled Temperature Chain (CTC) vaccines (e.g., MenAfriVac), the threshold temperature can be about 40° C. In some examples, the threshold temperature can be about 10° C. for blood, about 5° C. to about 8° C. for meats/leafy green vegetables, and about 34° C. for chocolate.

In some examples, for a given threshold temperature, the amount of time that is required for the change in conductivity or capacitance/dielectric constant may depend on the difference between the real temperature (to which the temperature indicator is exposed) and the given threshold temperature. For example, when the difference between the real temperature and the given threshold temperature is about 0° C., the amount of time that is required for the change in conductivity (e.g., response time) may be about 6 hours; when the difference is about 1° C., the response time may be about 3.5 hours; when the difference is about 2° C., the response time may be about 3 hours; and when the difference is about 5° C., the response time may be about 1 hour (and as the different increases, the response time may become flatter and flatter under 1 hour). In some examples, when the difference between the real temperature and the given threshold temperature is about 0° C., response time may be about 75 minutes; when the difference is about 1° C., the response time may be about 45 minutes; when the difference is about 3° C., the response time may be about 20 minutes; and when the difference is about 5° C., the response time may be about 10 minutes.

In some examples, the temperature responsive material 130 may be made of a solid with a melting point at or around the threshold temperature; a viscous material whose viscosity is low enough to prevent flow along the path 140 below the threshold temperature, but whose viscosity allows flow along the path 140 above the threshold temperature; or a material including at least one of alkane wax, fatty acid, ester, long-chain alkylated derivatives, side-chain crystalline polymer, acrylic-based polymer, and any combinations thereof. In other examples, the temperature responsive material 130 may be made of any other suitable nonconductive dielectric material that changes its state or viscosity so that it can flow along the path 140 when exposed to a temperature above the threshold temperature.

The side-chain crystalline polymers can provide a relatively sharp transition from the solid state to the liquid state. The side-chain crystalline polymer structures, e.g., the number and length of side chains, are very controllable based on synthesis parameters and, thus, the properties of the side-chain crystalline polymers (e.g., melting point, tightness of the transition, viscosity, etc.) are readily tuned. The melting range of the side-chain crystalline polymers generally is indicative of the sharpness of the solid state to liquid state transition. In some examples, the side-chain crystalline polymers may have a relatively narrow melting range, for example, a melting range of about 10° C., about 5° C., about 2° C., about 1° C., or about 0.5° C. The side-chain crystalline polymers can also have a relatively low melting temperature, such as about 55° C. to about 65° C., about 57.5° C. to about 62.5° C., about 45° C. to about 55° C., about 42.5° C. to about 47.5° C., about 35° C. to about 45° C., about 25° C. to about 35° C., about 27.5° C. to about 32.5° C., about 10° C. to about 25° C., about 65° C. or less, about 60° C. or less, about 55° C. or less, about 50° C. or less, about 45° C. or less, about 40° C. or less, about 35° C. or less, about 30° C. or less, about 25° C. or less, about 20° C. or less, about 15° C. or less, or about 10° C.

Not wishing to be bound by theory, it is believed that after exposure to a threshold temperature for a sufficient period of time, the side-chain crystalline polymers may melt and can flow along the path 140. As used herein, the term "melting temperature" or "melting point" may refer to the temperature at which a material exhibits peak unit heat absorption per degree Celsius, as determined by differential scanning calorimetry. Above its melting temperature, the material can exhibit liquid properties and below its melting temperature, the material can exhibit solid properties. As used herein, the term "melting temperature range" may refer to the temperature range from the melt onset temperature to the melting temperature of a material. As used herein, the term "melt onset temperature" may refer to the temperature at which the meltable material begins to exhibit an increase in unit heat absorption per degree Celsius, as determined by differential scanning calorimetry. Below its melt onset temperature, the material can be solid. The side-chain crystalline polymers can have a melting temperature close to the threshold temperature of the temperature indicator 100.

Suitable side-chain crystalline polymers may include polymers and copolymers of methacrylates and acrylates, having linear aliphatic side chains capable of becoming crystalline at a temperature of interest, for example, a temperature in the range of from about 10° C. to about 65° C. The side chains can have at least 10 carbon atoms, for example, from about 10 to about 30 carbon atoms, such as 10 to 30 carbon atoms, 10 to 24 carbon atoms, 10 to 22 carbon atoms, 10 to 20 carbon atoms, 12 to 18 carbon atoms, 14 to 16 carbon atoms, 14 to 18 carbon atoms, 16 to 18 carbon atoms, 12 to 16 carbon atoms, or 14 to 16 carbon atoms. Some examples of such polymers include poly(alkylmethacrylates) such as poly(hexadecylmethacrylate) or poly(octadecylmethacrylate), poly(alkylacrylates) such as poly(tetradecylacrylate), poly(hexadecylacrylate), or poly(dodecylacrylate), copolymers such as a copolymer of hexadecylacrylate and octadecylmethacrylate, poly(hexyl-co-dodecylacrylate), a copolymer of tetradecylacrylate and octadecylacrylate, a copolymer of hexadecylmethacrylate and octadecylmethacrylate, and a copolymer of tetradecylacrylate and hexadecylacrylate. Mixtures of two or more of any of the side-chain crystallizable polymers described herein can also be used. Examples of side-chain crystalline polymers also are disclosed in U.S. patent application Ser. No. 14/167,394, titled TIME-TEMPERATURE INDICATOR COMPRISING A SIDE CHAIN CRYSTALLINE POLYMER (Huffman et al.), filed Jan. 29, 2014, which is herein incorporated by reference in its entirety.

The characteristics of the side-chain crystalline polymers can be adjusted by introducing crosslinking into the polymer structure by including one or more crosslinking agents in the polymerization process. For example, a bifunctional acrylic or methacrylic ester, or other suitable compound, such as hexanediol diacrylate, can be included in the polymerization process to function as a crosslinking agent and yield a crosslinked polymer product. In some cases, a relatively low crosslink density, for example, from about 0.01 to about 0.09 intermolecular crosslinks per polymer chain, or weight average molecular weight, can be used.

As used herein, the term "molecular weight" may reference a weight average molecular weight, unless the context indicates a number average molecular weight. The side-chain crystalline polymers can have a molecular weight of at least about 1,000 Da, such as at least about 1,500 Da, at least about 2,000 Da, or at least about 5,000 Da. In some examples, the side-chain crystalline polymers may have a molecular weight in a range of about 2,000 Da to about 300,000 Da, such as about 3,000 Da to about 300,000 Da, about Da to about 250,000 Da, about 10,000 Da to about 200,000 Da, about 15,000 Da to about 150,000 Da, about 20,000 Da to about 120,000 Da, about 30,000 Da to about 100,000 Da, about 50,000 Da to about 80,000 Da, about 2,000 Da to about 20,000 Da, about 3,000 Da to about 15,000 Da, about 4,000 Da to about 10,000 Da, about 4,000 Da to about 5,000 Da, about 5,000 Da to about 6,000 Da, about 6,000 Da to about 7,000 Da, about 7,000 Da to about 8,000 Da, about 8,000 Da to about 9,000 Da, about 9,000 Da to about 10,000 Da, about 2,000 Da to about 10,000 Da, about 10,000 Da to about 20,000 Da, about 20,000 Da to about 30,000 Da, about 30,000 Da to about 50,000 Da, about 50,000 Da to about 100,000 Da, about 100,000 Da to about 150,000 Da, about 150,000 Da to about 200,000 Da, about 200,000 Da to about 250,000 Da, or about 250,000 Da to about 300,000 Da.

In general, higher molecular weight side-chain crystalline polymers can have a higher viscosity when in the liquid state at a temperature near its melting point than the corresponding side-chain crystalline polymers with a lower molecular weight. Thus, the characteristics of the side-chain crystalline polymers can also be adjusted by varying the molecular weight of the side-chain crystalline polymers. More details about the side-chain crystalline polymers are disclosed in international patent publication no. WO2020/231921, titled TEMPERATURE INDICATOR WITH ELECTROCHEMICAL SWITCH (Huffman et al.), filed May 11, 2020, which is herein incorporated by reference in its entirety.

In some examples, the path 140 may be a groove formed on the substrate 105. In some examples, the groove may be formed through a die-cutting process. In other examples, the groove may be formed through any other suitable process (e.g., laser etching, machining, etc.). In other examples, the path 140 may be in any other suitable form as long as it serves as a migration channel for the temperature responsive material 130, for example, a matrix (e.g., a polymer matrix), sponge, cable, or web along which the temperature responsive material 130 can migrate/diffuse into/along the gap 120.

In some examples, there may be a sudden change in the capacitance of the temperature indicator 100 when the temperature responsive material 130 starts migrating/diffusing into the gap 120. However, once the temperature responsive material 130 is already migrated/diffused into the gap 120, the capacitance of the temperature indicator 100 may continue to substantially change as the temperature is maintained at a level above the threshold temperature and/or as the exposure to the temperature above the threshold temperature continues (for at least a certain amount of time, such as 2 hours, 5 hours, or 10 hours, for example, until the temperature responsive material 130 is fully dispersed within the path 140). Therefore, at a different temperature level and/or exposure time, a capacitance value curve can be developed. This curve can be used to match the measured capacitance value to a corresponding temperature (e.g., temperature range), exposure time, or combination of both.

In some examples, the temperature responsive material 130 may change color after exposure to above or below a certain threshold temperature for a predetermined amount of time or less. In this way, the user of the temperature indicator 100 can be notified about the temperature change without having to use any separate tool (e.g., RFID reader). In response to being notified about the change, the user may try to use a separate tool to obtain more accurate information about the temperature change (e.g., current temperature, historical curve, exposure time).

In some examples, the temperature responsive material 130 may include a color-changing ink (e.g., diacetylene). The color change may include at least one of a change in color, color density, fluorescence, or opacity. In some examples, the color change of the temperature responsive material 130 may be irreversible. In other examples, the color change of the temperature responsive material 130 may be reversible.

In some examples, the length of the first/second electrode 111/112 may be about 0.5 to 3 inches. In other examples, the first/second electrode 111/112 may have any other suitable length. In some examples, the thickness of the first/second electrode 111/112 may be about 1 to about 5 mil, about 5 to about 15 mil, about 15 to about 50 mil, or about to about 100 mil. In other examples, the first/second electrode 111/112 may have any other suitable thickness.

In some examples, the length/width of the temperature responsive material 130 may be about 0.1 to 3 inches. In other examples, the temperature responsive material 130 may have any other suitable length/width. In some examples, the thickness of the temperature responsive material 130 may be about 0.1 to about 0.5 mil, about 0.5 to about 1.5 mil, about 1.5 to about 5.0 mil, or about 5.0 to about 10.0 mil. In other examples, the temperature responsive material 130 may have any other suitable thickness.

Figure 2A:
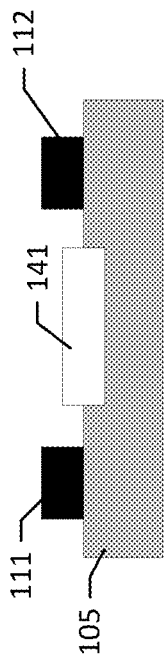
FIGS. 2A, 2B, 2C, and 2D are various examples of a cross-sectional view of the temperature indicator of FIG. 1 along the line of A-A.
Figure 2B:
Figure 2C:
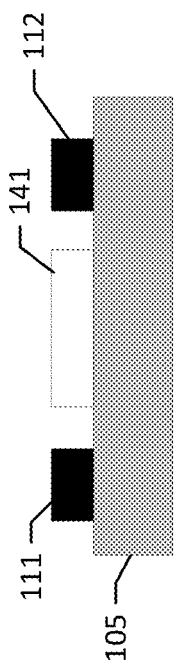
Figure 2D:
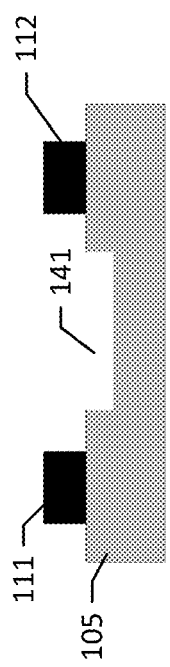

FIGS. 2A, 2B, 2C, and 2D show various examples of a cross-sectional view of the temperature indicator of FIG. 1 along the line of A-A. In FIGS. 2A and 2B, the path 140 may be in the form of a cable, matrix, sponge, or web. In FIG. 2A, the path 140 is placed on the substrate 105. In FIG. 2B, the path 140 may be a combination of a groove and one of a cable, matrix, sponge, or web. That is, in FIG. 2B, a groove is formed on the substrate and the cable, matrix, sponge, or web is placed on the groove. In FIGS. 2C and 2D, the path 140 may be in the form of a groove formed on the substrate 105. In FIG. 2D, the first and second electrodes 111 and 112 may be also disposed in the substrate 105. For example, the substrate 105 may be etched and the electrodes 111, 112 may be placed in the etched channels.

Figure 3:
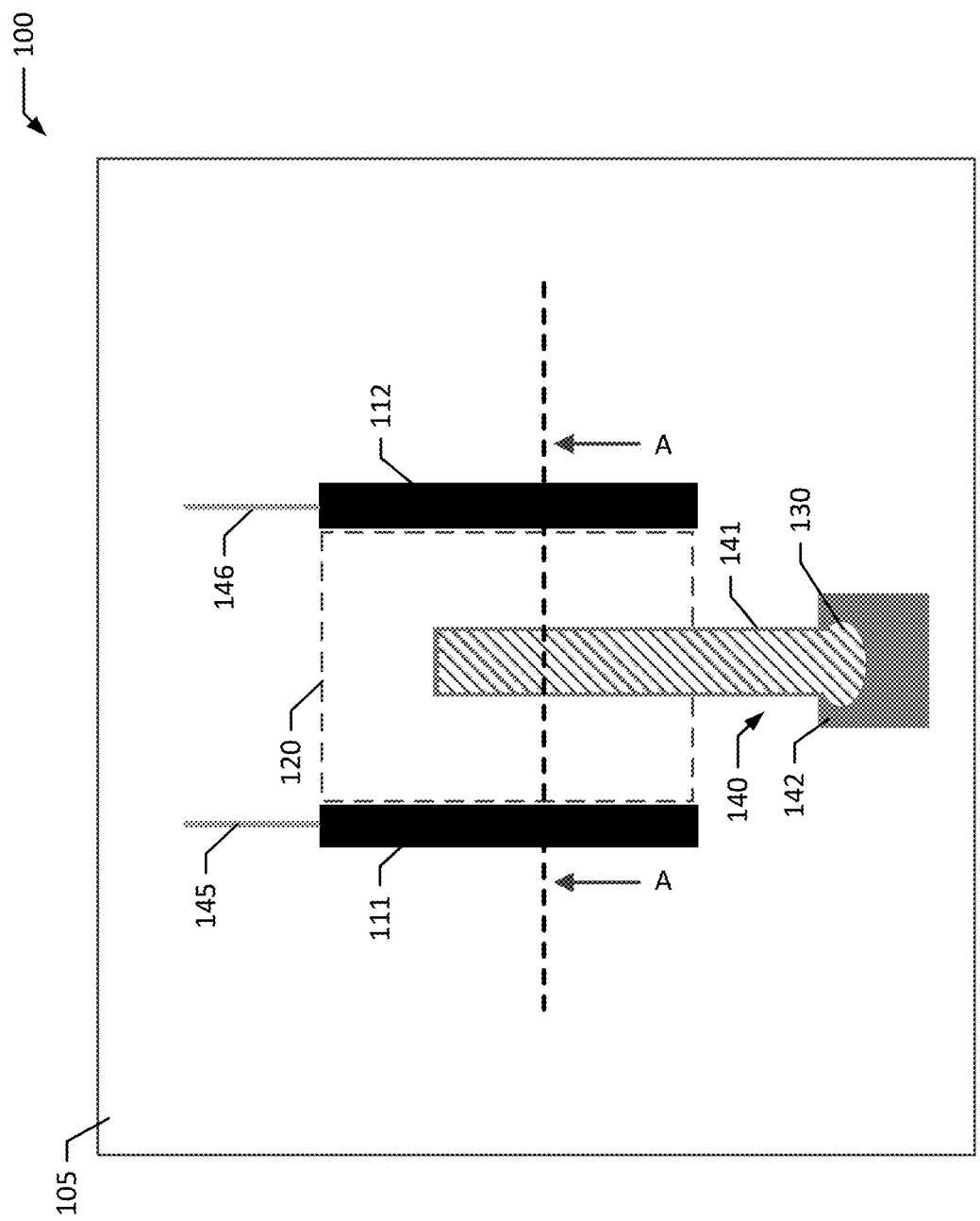
FIG. 3 is a diagram of the temperature indicator of FIG. 1 after the temperature indicator is exposed to a temperature above a threshold temperature.
Figure 4A:
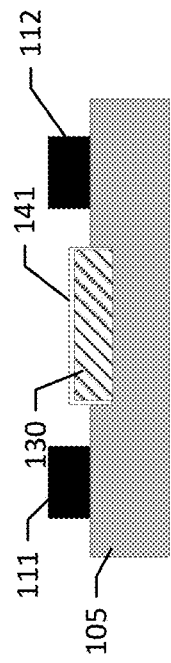
FIGS. 4A, 4B, 4C, and 4D are various examples of a cross-sectional view of the temperature indicator of FIG. 3 along the line of A-A after the temperature indicator is exposed to a temperature above a threshold temperature.
Figure 4C:
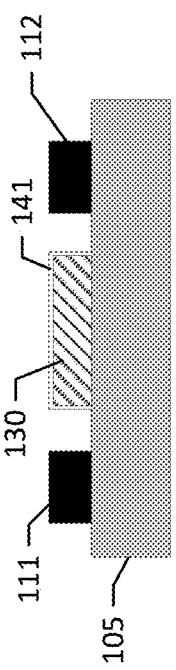
Figure 4B:
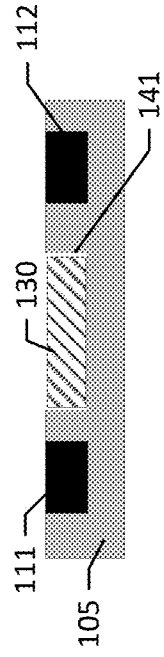
Figure 4D:
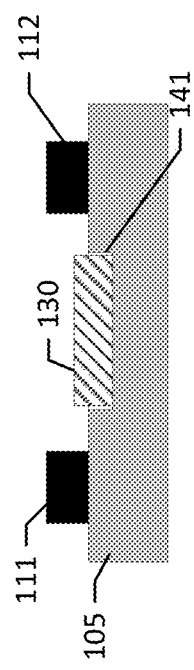

FIG. 3 illustrates the temperature indicator of FIG. 1 after the temperature indicator is exposed to a temperature above the threshold temperature (for example, for least the predetermined time period). In FIG. 3, the temperature responsive material 130 migrates/diffuses along the path 140 (e.g., the channel portion 141) and into/along the gap 120.

FIGS. 4A, 4B, 4C, and 4D show the various examples of a cross-sectional view of the temperature indicator of FIG. 3 along the line of A-A after the temperature indicator is exposed to a temperature above the threshold temperature. After the migration/diffusion, the temperature responsive material 130 (at least a portion thereof) is disposed between the first electrode 111 and the second electrode 112, thereby changing the capacitance of the capacitor 110/temperature indicator 100.

Figure 5:
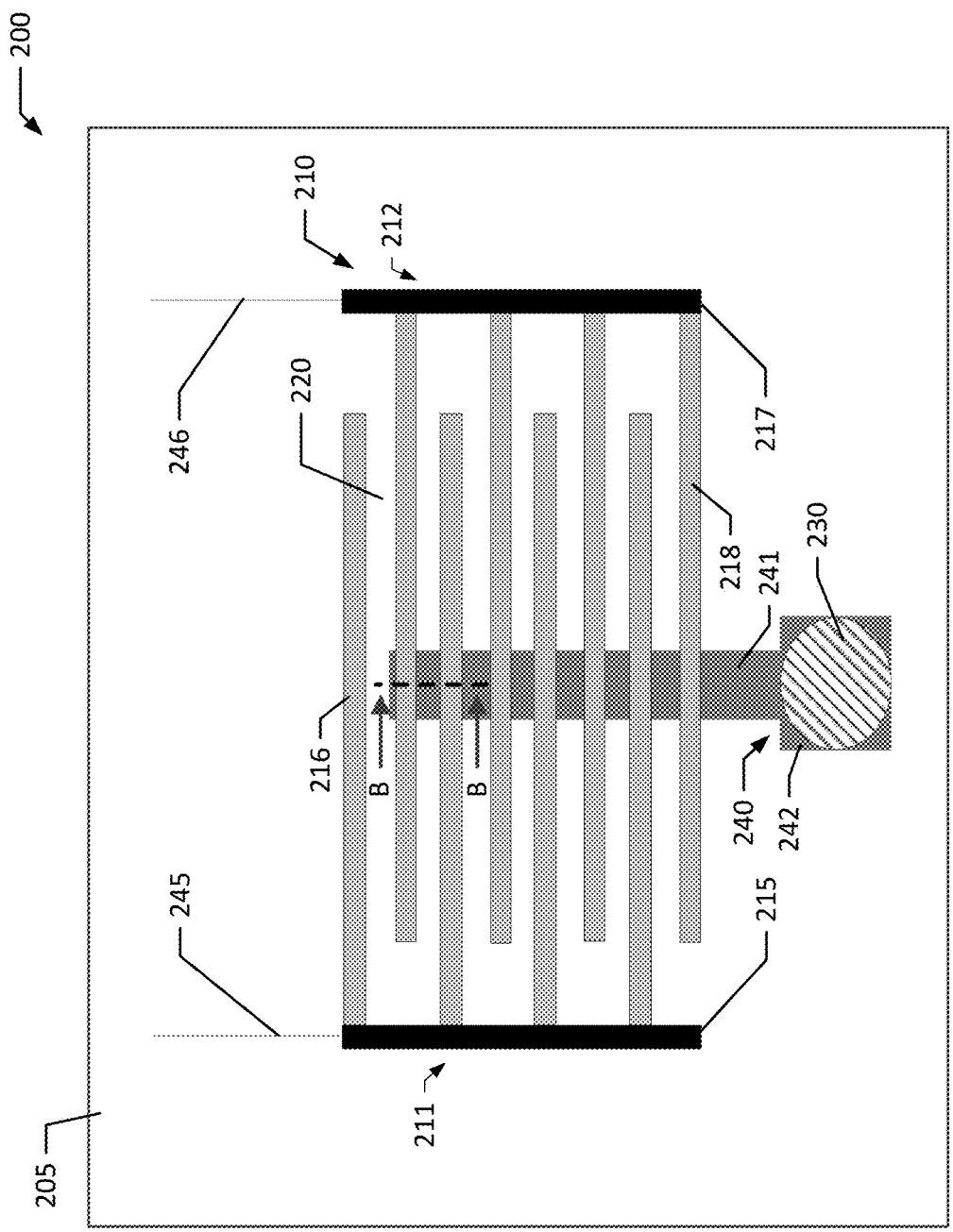
FIG. 5 is a diagram of a temperature indicator according to an example embodiment of the present disclosure.

FIG. 5 is a diagram of a temperature indicator 200 according to an example embodiment of the present disclosure. The temperature indicator 200 may include a capacitor 210 having a first electrode 211, a second electrode 212, a gap 220 between the first electrode 211 and the second electrode 212. In some examples, the first electrode 211 may be connected to a first contact terminal 245, and the second electrode 212 may be connected to a second contact terminal 246. In some examples, a substrate 205 may be provided, and the temperature indicator 200 may be disposed on or in the substrate 205.

In the temperature indicator 200, the first electrode 211 and the second electrode 212 may be in a comb shape and interleaved with each other. For example, the first electrode 211 may include a first base plate 215 and plurality of first sub-electrodes 216 extending from the first base plate 215, and the second electrode 212 may include a second base plate 217 and plurality of second sub-electrodes 218 extending from the second base plate 217. The gap 220 may be formed between the first base plate 215 and the plurality of first sub-electrodes 216 of the first electrode 211 and the second base plate 217 and the plurality of second sub-electrodes 218 of the second electrode 212.

In some examples, the temperature indicator 200 may further include a temperature responsive material 230 and a path 240 for the temperature responsive material 230. In some examples, the path 240 may include a holder portion 242 configured to hold the temperature responsive material 230 and a channel portion 241 through which the temperature responsive material 230 is configured to move. The path 240 may connect the temperature responsive material 230 to the gap 220.

In some examples, the temperature responsive material 230 may be configured to migrate/diffuse along the path 240 (e.g., the channel portion 241) and into or along the gap 220 in response to exposure to a temperature above a threshold temperature. The migration of the temperature responsive material 230 into or along the gap 220 may cause a change of the capacitance of the capacitor 210. As the temperature responsive material 230 is migrated/diffused into/along the gap 220, there may be a change in the dielectric constant of the portion of the gap 220, thereby changing the capacitance of the temperature indicator 200. When the temperature indicator 200 is associated with an RFID tag system, this may cause an integrated circuit of the RFID tag system to indicate the temperature change.

In some examples, the path 240 (e.g., the channel portion 241) may be disposed below the capacitor (e.g., the sub-electrodes 216, 218), and some portions of the channel portions 241 are disclosed between the sub-electrodes 216, 218. FIGS. 6A, 6B, and 6C show various examples of a cross-sectional view of the temperature indicator of FIG. 5 along the line of B-B. As shown in FIGS. 6A, 6B, and 6C, the channel portion 241 is disposed below the sub-electrodes 216, 218, and some portions of the channel portions 241 are disclosed between the sub-electrodes 216, 218.

In FIGS. 6A and 6B, the path 240 may be in the form of a cable, matrix, sponge, or web. In FIG. 6A, the path 240 is placed on the substrate 205. In FIG. 6B, the path 240 may be a combination of a groove and one of a cable, matrix, sponge, or web. That is, in FIG. 6B, a groove is formed on the substrate and the cable, matrix, sponge, or web is placed on the groove. In FIG. 6C, the path 240 may be in the form of a groove formed on the substrate 205.

Other configurations/features/characteristics of the temperature indicator 200 (e.g., temperature responsive material, filer material, threshold temperature, reversibility, color change, response time, material, size of the components, etc.) may be similar to and/or same as the ones described above with respect to the temperature indicator 100, and, thus, duplicate description may be omitted.

Figure 7:
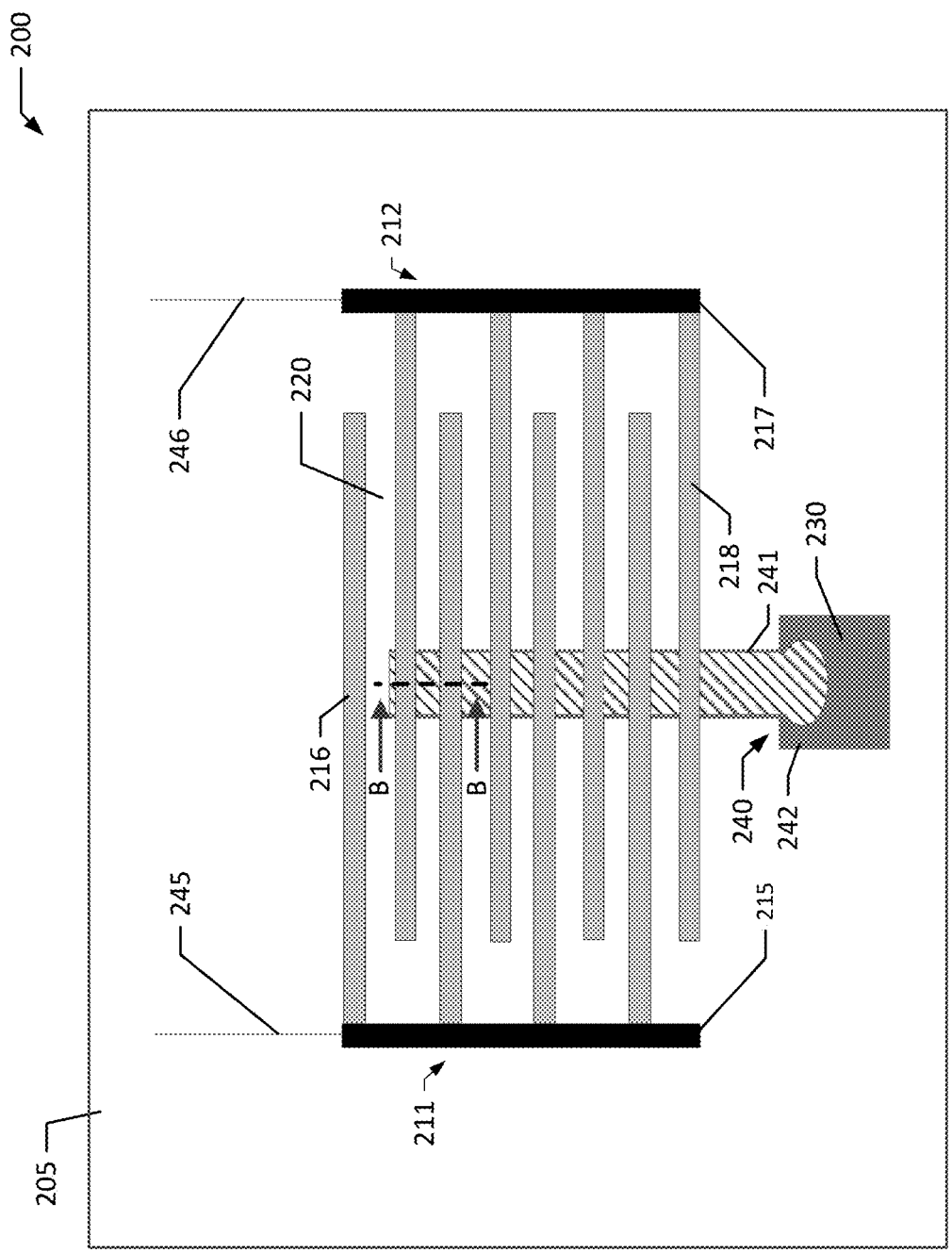
FIG. 7 is a diagram of the temperature indicator of FIG. 5 after the temperature indicator is exposed to a temperature above a threshold temperature.

FIG. 7 illustrates the temperature indicator 200 of FIG. 5 after the temperature indicator 200 is exposed to a temperature above the threshold temperature. In FIG. 7, the temperature responsive material 230 migrates/diffuses along the path 240 (e.g., the channel portion 241) and into or along the gap 220. FIGS. 8A, 8B, and 8C show the various examples of a cross-sectional view of the temperature indicator of FIG. 7 along the line of B-B after the temperature indicator is exposed to a temperature above the threshold temperature. After the migration/diffusion, the temperature responsive material 230 is disposed between the first sub-electrode 216 and the second sub-electrode 218, thereby changing the capacitance of the capacitor 210/temperature indicator 200.

Figure 9:
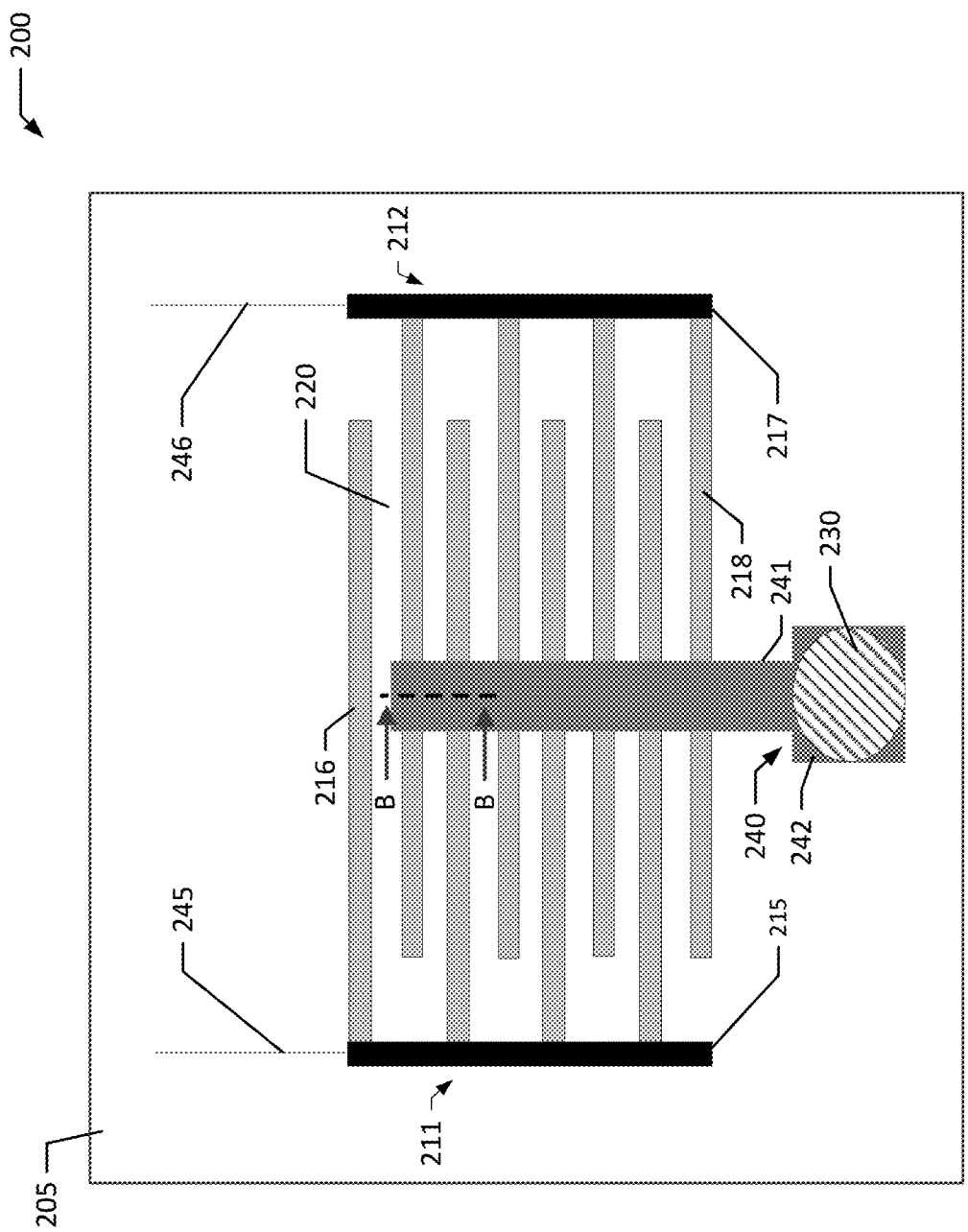
FIG. 9 is a diagram of a temperature indicator according to an example embodiment of the present disclosure.
Figure 10A:
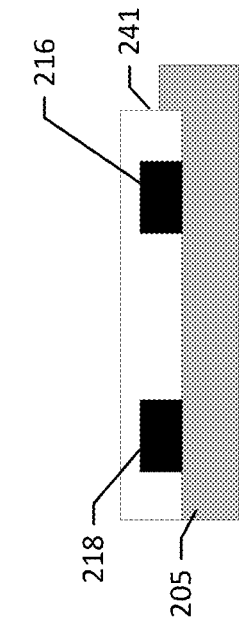
FIGS. 10A, 10B, and 10C are various examples of a cross-sectional view of the temperature indicator of FIG. 9 along the line of B-B.
Figure 10B:
Figure 10C:
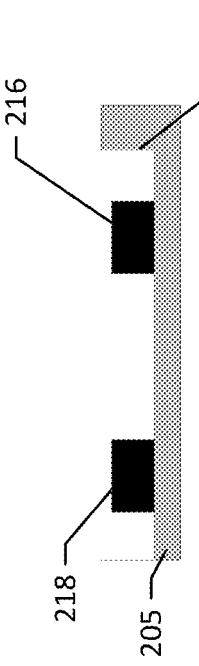

As shown in FIG. 9, in some examples, the path 240 (e.g., the channel portion 241) may be disposed above the capacitor 210 (e.g., the sub-electrodes 216, 218), and some portions of the channel portions 241 are disclosed between the sub-electrodes 216, 218. FIGS. 10A, 10B, and 10C show various examples of a cross-sectional view of the temperature indicator 200 of FIG. 9 along the line of B-B. As shown in FIGS. 10A, 10B, and 10C, the channel portion 241 is disposed above the sub-electrodes 216, 218, and some portions of the channel portions 241 are disclosed between the sub-electrodes 216, 218.

In FIGS. 10A and 10B, the path 240 may be in the form of a cable, matrix, sponge, or web. In FIG. 10A, the path 240 is placed on the substrate 205. In FIG. 10B, the path 240 may be a combination of a groove and one of a cable, matrix, sponge, or web. That is, in FIG. 10B, a groove is formed on the substrate 205 and the cable, matrix, sponge, or web is placed on the groove. In FIG. 10C, the path 240 may be in the form of a groove formed on the substrate 205.

Figure 11:
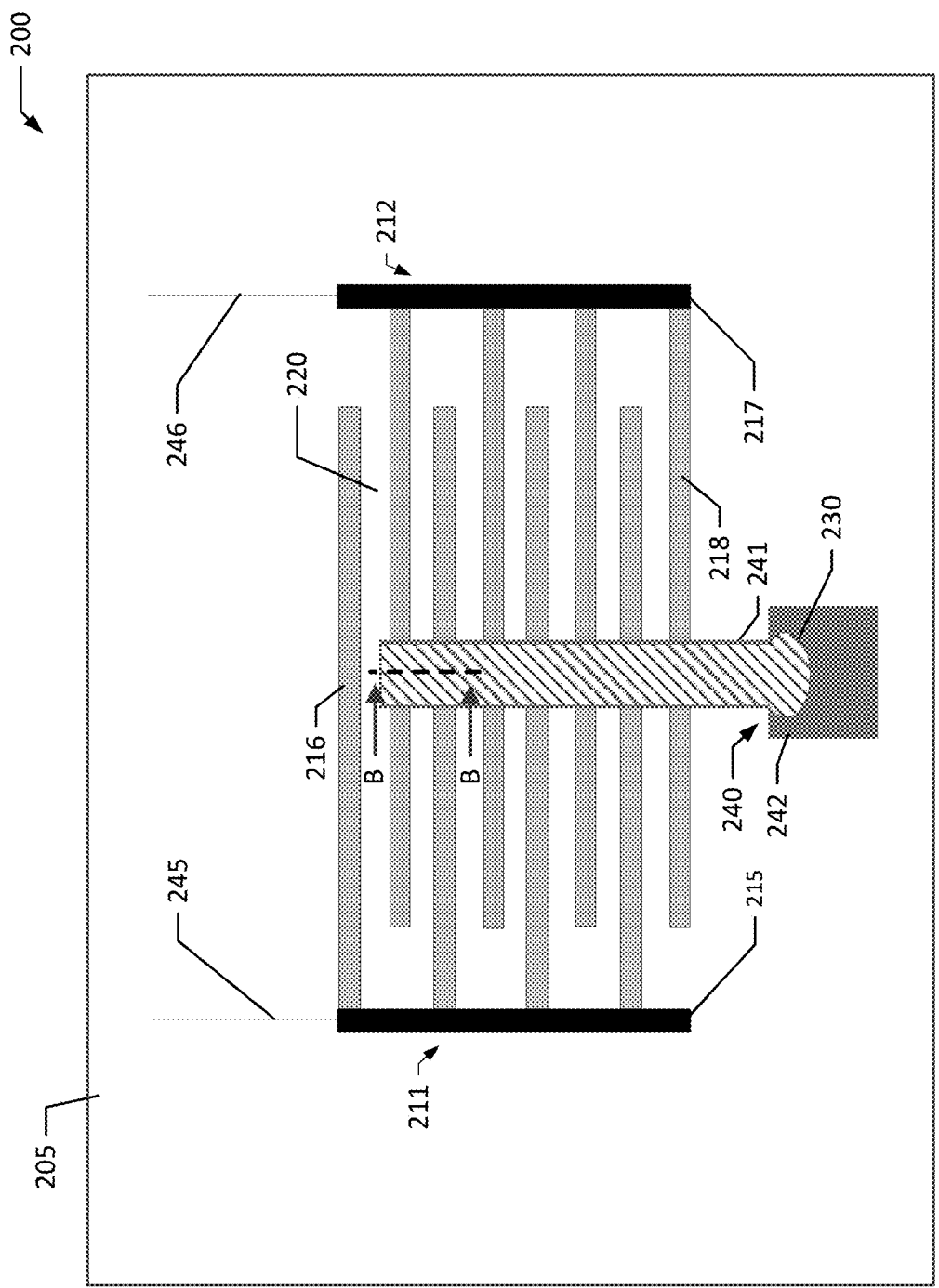
FIG. 11 is a diagram of the temperature indicator of FIG. 9 after the temperature indicator is exposed to a temperature above a threshold temperature.

FIG. 11 illustrates the temperature indicator 200 of FIG. 10 after the temperature indicator 200 is exposed to a temperature above the threshold temperature (for example, for at least the predetermined time period). In FIG. 11, the temperature responsive material 230 migrates/diffuses along the path 240 (e.g., the channel portion 241) and into or along the gap 220. FIGS. 12A, 12B, and 12C show various examples of a cross-sectional view of the temperature indicator of FIG. 11 along the line of B-B after the temperature indicator is exposed to a temperature above the threshold temperature. After the migration, the temperature responsive material 230 is disposed between the first sub-electrode 216 and the second sub-electrode 218, thereby changing the capacitance of the capacitor 210/temperature indicator 200.

Figure 13:
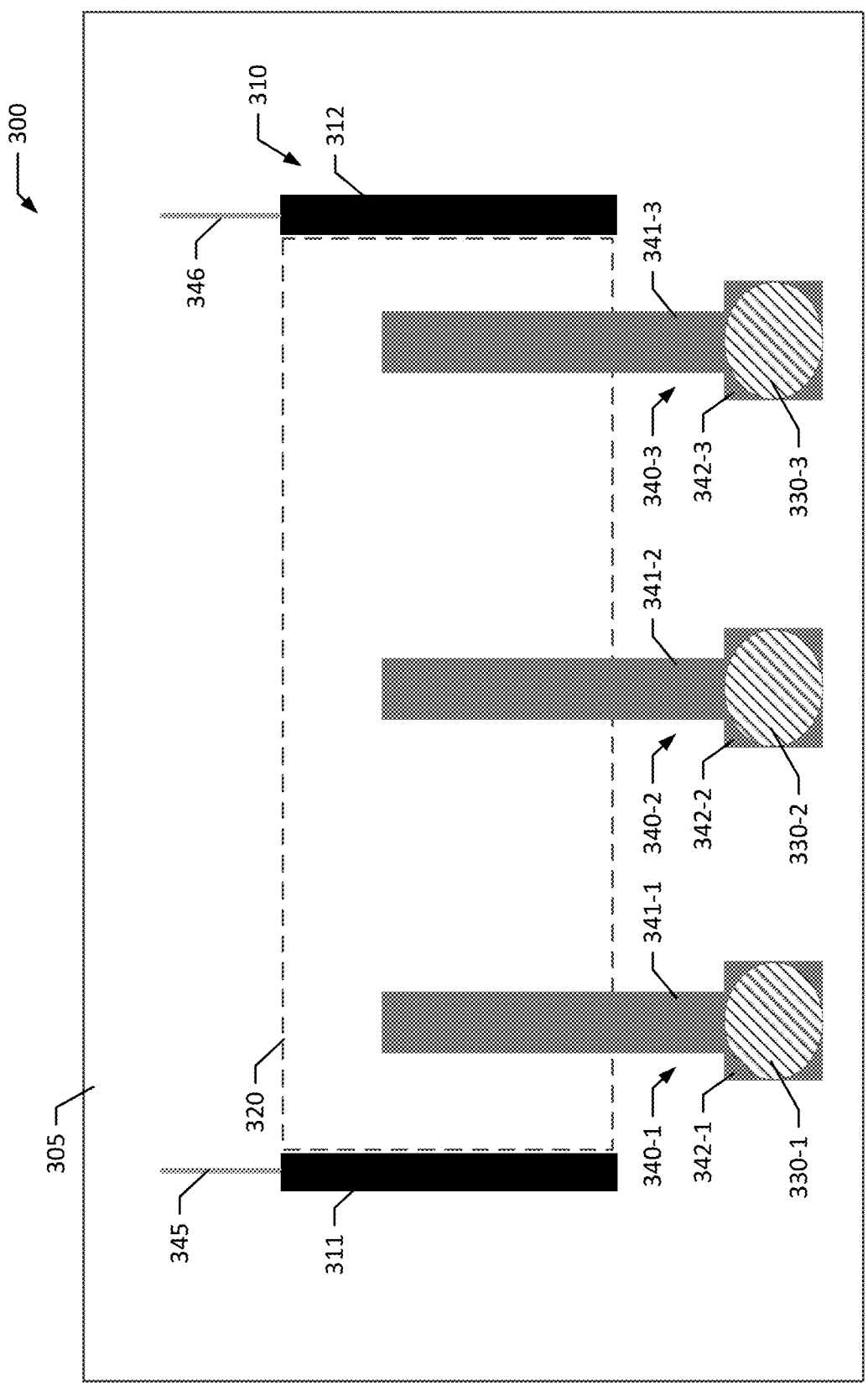
FIG. 13 is a diagram of a temperature indicator according to an example embodiment of the present disclosure.

FIG. 13 is a diagram of a temperature indicator 300 according to an example embodiment of the present disclosure. The temperature indicator 300 may include a capacitor 310 having a first electrode 311, a second electrode 312, a gap 320 between the first electrode 311 and the second electrode 312. In some examples, the first electrode 311 may be connected to a first contact terminal 345, and the second electrode 312 may be connected to a second contact terminal 346. In some examples, a substrate 305 may be provided, and the temperature indicator 300 may be disposed on or in the substrate 305.

In some examples, the temperature indicator 300 may include a plurality of temperature responsive materials and paths. For example, the temperature indicator 300 may include a first temperature responsive material 330-1 and a first path 340-1, a second temperature responsive material 330-2 and a second path 340-2, and a third temperature responsive material 330-3 and a third path 340-3. Although there are three temperature responsive materials and paths shown in FIG. 13, there could be more or less than three temperature responsive materials and paths (e.g., 2, 4, 5, 6, 7 . . . ).

Each of the paths 340-1, 340-2, 340-3 may include a holder portion 342-1, 342-2, 342-3 configured to hold the respective temperature responsive material 330-1, 330-2, 330-3 and a channel portion 341-1, 341-2, 341-3 through which the respective temperature responsive material 330-1, 330-2, 330-3 can migrate/diffuse into or along the gap 320. The paths 340-1, 340-2, 340-3 may connect the temperature responsive material 330-1, 330-2, 330-3 to the gap 320.

The first temperature responsive material 330-1 may migrate along the first path 340-1 and into or along the gap 320 in response to exposure to a temperature above a first threshold temperature. The second temperature responsive material 330-2 may migrate along the second path 340-2 and into or along the gap 320 in response to exposure to a temperature above a second threshold temperature. The third temperature responsive material 330-3 may migrate along the second path 340-3 and into or along the gap 320 in response to exposure to a temperature above a third threshold temperature. In some examples, the temperature responsive materials 330-1, 330-2, 330-3 may have a threshold temperature that is different from each other. For example, the second threshold temperature (e.g., 50° C.) may be greater than the first threshold temperature (e.g., 35° C.), and the third threshold temperature (e.g., 65° C.) may be greater than the second threshold temperature. In some examples, the distance between the capacitor 310 (e.g., gap 320) and each of the temperature responsive materials 330-1, 330-2, 330-3 may be the same as each other.

In some examples, the temperature responsive materials 330-1, 330-2, 330-3 may have a threshold temperature that is the same as each other. In this case, the distance between the capacitor 310 and each of the temperature responsive materials 330-1, 330-2, 330-3 may be different from each other. For example, the first temperature responsive material 330-1 (and the first holder portion 342-1) may be disposed at a first predetermined distance away from the capacitor 310/gap 320, the second temperature responsive material 330-2 (and the second holder portion 342-2) may be disposed at a second predetermined distance away from the capacitor 310/gap 320, and the third temperature responsive material 330-3 (and the third holder portion 342-3) may be disposed at a third predetermined distance away from the capacitor 310/gap 320. The second predetermined distance may be greater than the first predetermined distance, and the third predetermined distance may be greater than the second predetermined distance. In this case, the first, second, and third temperature responsive materials 330-1, 330-2, 330-3 may start migrating along the respective path and into or along the gap 320 in response to exposure to a temperature above the same threshold temperature, but since the distance between the capacitor 310/gap 320 and each temperature responsive material is different, each temperature responsive material may arrive at the gap 320 at a different time. In this way, the temperature indicator 300 can detect the amount of time (e.g., range of time) for which the temperature indicator 300 was exposed to the temperature above the threshold temperature more accurately, and the exposure time can be calibrated in this way.

For example, at least the first, second, and third predetermined time periods (e.g., 2 hours, 4 hours, and 6 hours, respectively) of exposure above the threshold temperature may be required for the migration of the first, second, and third temperature responsive materials 330-1, 330-2, 330-3, respectively, to cause the change of the capacitance of the capacitor 310 after an initial exposure to the temperature above the threshold temperature. When the capacitance change of the temperature indicator 300 indicates that the capacitance change is due to the migration of only the first temperature responsive material 330-1, the system/user can determine that the temperature indicator 300 was exposed to the temperature above the threshold temperature for more than the first predetermined time period (e.g., 2 hours) but less than the second predetermined time period (e.g., 4 hours).

In the above example, the temperature responsive materials 330-1, 330-2, 330-3 have different response times by configuring the temperature indicator 300 to have a different distance between the capacitor 310/gap 320 and each of the temperature responsive materials 330-1, 330-2, 330-3. In some examples, the width of each of the paths 340-1, 340-2, 340-3 can be tuned (for example, while the length of each path is the same as each other) so that they have a different width from each other, thereby having different response times. For example, the width of the second path 340-2 may be greater than the width of the first path 340-1, and the width of the third path 340-3 may be greater than the width of the second path 340-2. In this case, the response time of the second dielectric material 330-2/second path 340-2 may be greater than the response time of the first dielectric material 330-1/first path 340-1, and the response time of the third dielectric material 330-3/third path 340-3 may be greater than the response time of the second dielectric material 330-2/second path 340-2. In other examples, the materials for the temperature responsive materials 330-1, 330-2, 330-3 can be tuned, so that they have different flow rates/viscosity when exposed to a temperature above the threshold temperature, thereby having different response times. In this case, the distance between the gap 320 and each of the temperature responsive materials 330-1, 330-2, 330-3 may be the same as each other.

In some examples, the temperature responsive materials 330-1, 330-2, 330-3 may have different threshold temperatures and different predetermined time periods. For example, the first temperature responsive material 330-1 may migrate along the first path 340-1 and into or along the gap 320 in response to exposure to a temperature above a first threshold temperature (e.g., 35° C.) after a first predetermined time period (2 hours) of exposure above the first threshold temperature. The second temperature responsive material 330-2 may migrate along the second path 340-2 and into or along the gap 320 in response to exposure to a temperature above a second threshold temperature (e.g., 50° C.) after a second predetermined time period (e.g., 4 hours) of exposure above the second threshold temperature. The third temperature responsive material 330-3 may migrate along the third path 340-3 and into or along the gap 320 in response to exposure to a temperature above a third threshold temperature (e.g., 65° C.) after a third predetermined time period (e.g., 6 hours) of exposure above the second threshold temperature.

In some examples, only one of the threshold temperature and the response time may be the same for all temperature responsive materials 330-1, 330-2, 330-3. For example, the first temperature responsive material 330-1 may migrate along the first path 340-1 and into or along the gap 320 in response to exposure to a temperature above a first threshold temperature (e.g., 35° C.) after a first predetermined time period (2 hours) of exposure above the first threshold temperature. The second temperature responsive material 330-2 may migrate along the second path 340-2 and into or along the gap 320 in response to exposure to a temperature above a second threshold temperature (e.g., 50° C.) after the first predetermined time period (e.g., 2 hours) of exposure above the second threshold temperature. The third temperature responsive material 330-3 may migrate along the third path 340-3 and into or along the gap 320 in response to exposure to a temperature above a third threshold temperature (e.g., 65° C.) after the first predetermined time period (e.g., 2 hours) of exposure above the second threshold temperature.

In some examples, the first temperature responsive material 330-1 may migrate along the first path 340-1 and into or along the gap 320 in response to exposure to a temperature above a first threshold temperature (e.g., 35° C.) after a first predetermined time period (2 hours) of exposure above the first threshold temperature. The second temperature responsive material 330-2 may migrate along the second path 340-2 and into or along the gap 320 in response to exposure to a temperature above the first threshold temperature (e.g., 35° C.) after a second predetermined time period (e.g., 4 hours) of exposure above the first threshold temperature. The third temperature responsive material 330-3 may migrate along the third path 340-3 and into or along the gap 320 in response to exposure to a temperature above the first threshold temperature (e.g., 35° C.) after a third predetermined time period (e.g., 6 hours) of exposure above the first threshold temperature.

Other configurations/features/characteristics of the temperature indicator 300 (e.g., temperature responsive material, filer material, threshold temperature, reversibility, color change, response time, material, size of the components, cross-sectional views, etc.) may be similar to and/or same as the ones described above with respect to the temperature indicator 100, and, thus, duplicate description may be omitted.

In some examples, the temperature indicator 300 may include a plurality of capacitors (each having a first electrode, a second electrode, a gap between the first electrode and the second electrode). Each of the capacitors may include at least one temperature responsive material and at least one path. For example, the first temperature responsive material 330-1 and the first path 340-1 may be matched with a first capacitor, the second temperature responsive material 330-2 and the second path 340-2 may be matched with second capacitor, and the third temperature responsive material 330-3 and the third path 340-3 may be matched with a third capacitor. In some examples, each capacitor may be considered as a separate sub-indicator, and connected to the RFID chip (e.g., integrated circuit 620) separately, and the RFID chip may detect capacitance value/change of the each sub-indicator, for example, to determine whether the respective threshold temperature/response time of each capacitor has been exceeded.

Other configurations/features/characteristics of the temperature indicator 300 when it has multiple capacitors (e.g., temperature responsive material, filer material, threshold temperature, reversibility, color change, response time, material, size of the components, cross-sectional views, or different/same threshold temperature, response time, or path length/width between multiple temperature responsive materials and/or paths, etc.) may be similar to and/or same as the ones described above with respect to the temperature indicator 300, and, thus, duplicate description may be omitted.

Figure 14:
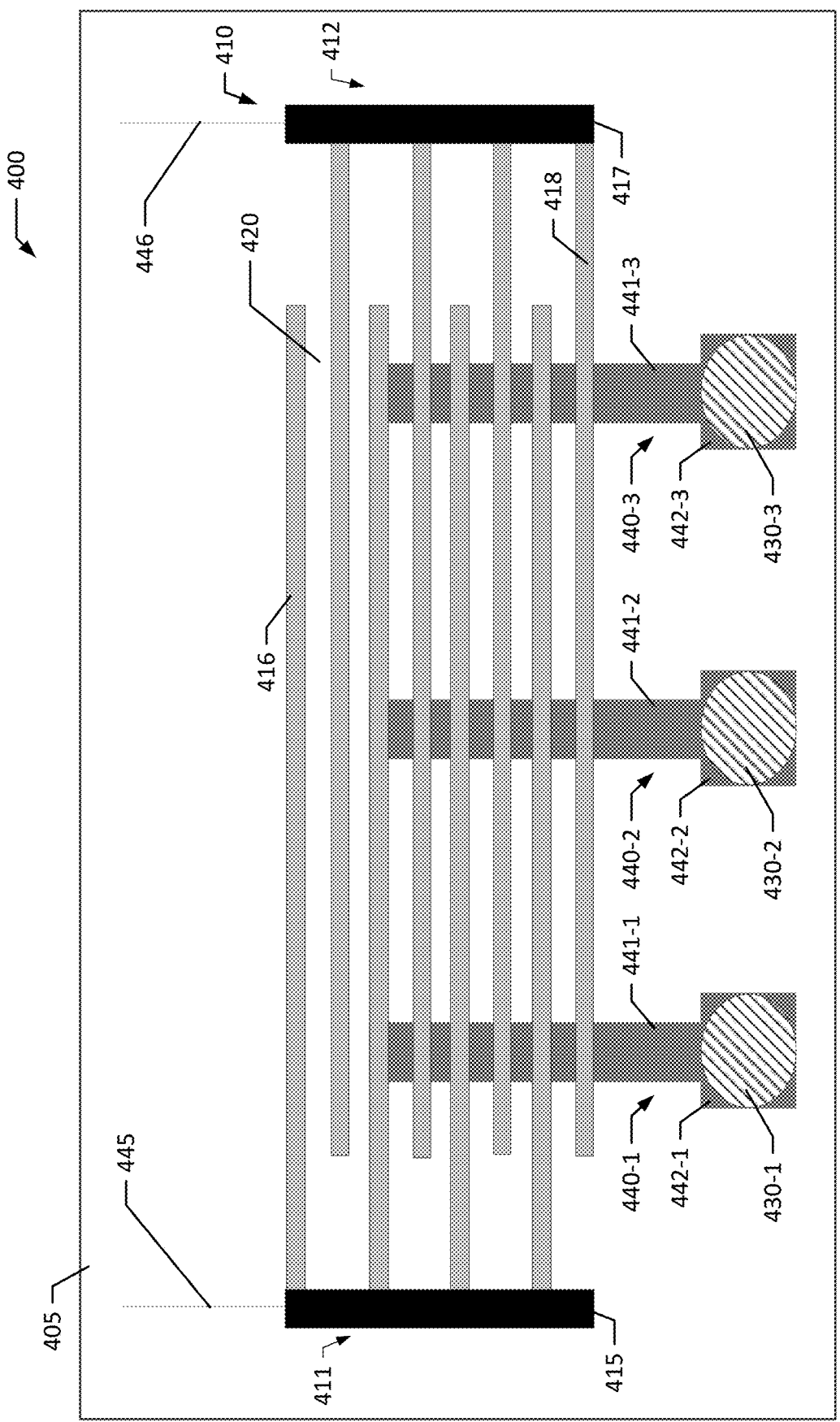
FIG. 14 is a diagram of a temperature indicator according to an example embodiment of the present disclosure.

FIG. 14 is a diagram of a temperature indicator 400 according to an example embodiment of the present disclosure. The temperature indicator 400 may include a capacitor 410 having a first electrode 411, a second electrode 412, a gap 420 between the first electrode 411 and the second electrode 412. In some examples, the first electrode 411 may be connected to a first contact terminal 445, and the second electrode 412 may be connected to a second contact terminal 446. In some examples, a substrate 405 may be provided, and the temperature indicator 400 may be disposed on or in the substrate 405.

In the temperature indicator 400, the first electrode 411 and the second electrode 412 may be in a comb shape and interleaved with each other. For example, the first electrode 411 may include a first base plate 415 and plurality of first sub-electrodes 416 extending from the first base plate 415, and the second electrode 412 may include a second base plate 417 and plurality of second sub-electrodes 418 extending from the second base plate 417. The gap 420 may be formed between the first base plate 415 and the plurality of first sub-electrodes 416 of the first electrode 411 and the second base plate 417 and the plurality of second sub-electrodes 418 of the second electrode 412.

Similar to the temperature indicator 300, in some examples, the temperature indicator 400 may include a plurality of temperature responsive materials and paths. For example, the temperature indicator 400 may include a first temperature responsive material 430-1 and a first path 440-1, a second temperature responsive material 430-2 and a second path 440-2, and a third temperature responsive material 430-3 and a third path 440-3. Although there are three temperature responsive materials and paths shown in FIG. 14, there could be more or less than three temperature responsive materials and paths (e.g., 2, 4, 5, 6, 7 . . . ).

Each of the paths may include a holder portion 442-1, 442-2, 442-3 configured to hold the temperature responsive material 430-1, 430-2, 430-3 and a channel portion 441-1, 441-2, 441-3 through which the temperature responsive material 430-1, 430-2, 430-3 can migrate/diffuse into or along the gap 420. The paths 440-1, 440-2, 440-3 may connect the temperature responsive material 430-1, 430-2, 430-3 to the gap 420.

In some examples, the first temperature responsive material 430-1 may migrate along the first path 440-1 and into or along the gap 420 in response to exposure to a temperature above a first threshold temperature for at least a first predetermined time period. The second temperature responsive material 430-2 may migrate along the second path 440-2 and into or along the gap 420 in response to exposure to a temperature above a second threshold temperature for at least a second predetermined time period. The third temperature responsive material 430-3 may migrate along the third path 440-3 and into or along the gap 420 in response to exposure to a temperature above a third threshold temperature for a third predetermined time period. In some examples, the first, second, and third threshold temperatures may be the same as each other. In other examples, at least two of the first, second, and third threshold temperatures may be different from each other. In some examples, the first, second, and third predetermined time periods may be the same as each other. In other examples, at least two of the first, second, and third predetermined time periods may be different from each other.

Figure 15:
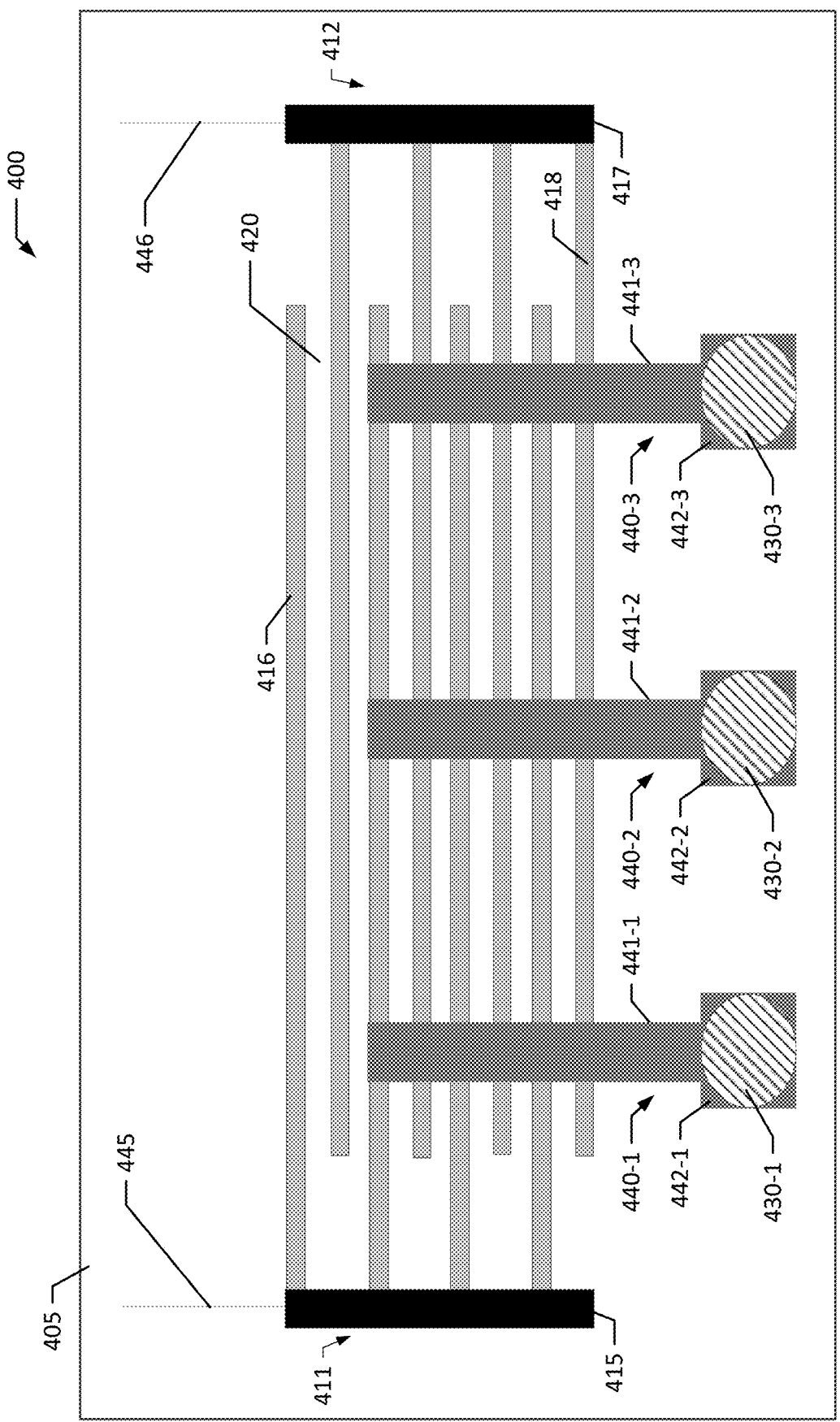
FIG. 15 is a diagram of a temperature indicator according to an example embodiment of the present disclosure.

In some examples, as shown in FIG. 14, the paths 440-1, 440-2, 440-3 of the temperature indicator 400 may be disposed below the capacitor 410 (e.g., the sub-electrodes 416, 418). In other examples, as shown in FIG. 15, the paths 440-1, 440-2, 440-3 of the temperature indicator 400 may be disposed above the capacitor 410 (e.g., the sub-electrodes 416, 418).

Other configurations/features/characteristics of the temperature indicator 400 (e.g., temperature responsive material, filer material, threshold temperature, reversibility, color change, response time, material, size of the components, configurations of the multiple temperature responsive materials, cross-sectional views, etc.) may be similar to and/or same as the ones described above with respect to the temperature indicator 100, 200, and/or 300, and, thus, duplicate description may be omitted.

Figure 16:
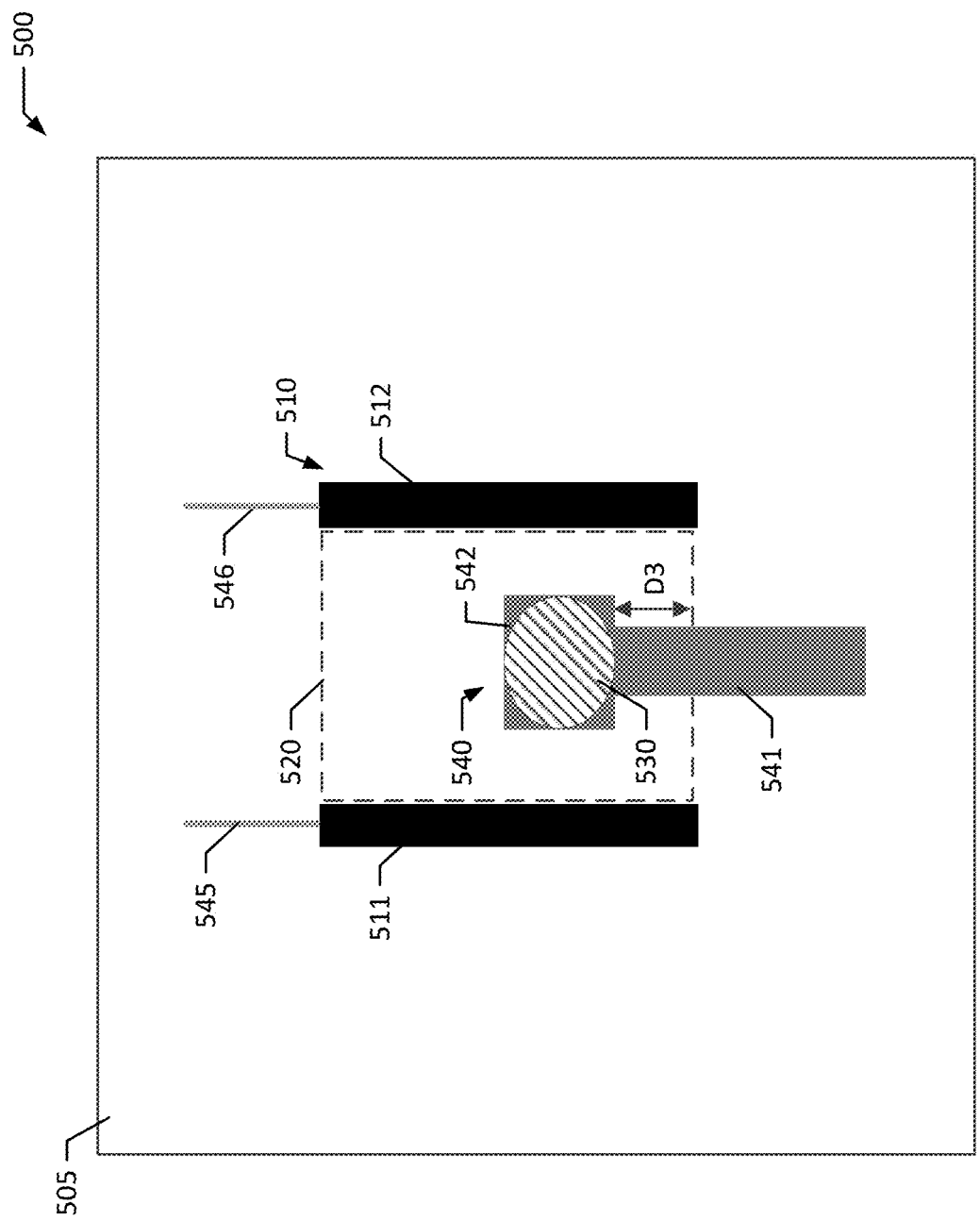
FIG. 16 is a diagram of a temperature indicator according to an example embodiment of the present disclosure.

FIG. 16 is a diagram of a temperature indicator 500 according to an example embodiment of the present disclosure. The temperature indicator 500 may include a capacitor 510 having a first electrode 511, a second electrode 512, a gap 520 between the first electrode 511 and the second electrode 512. In some examples, the first electrode 511 may be connected to a first contact terminal 545, and the second electrode 512 may be connected to a second contact terminal 546. In some examples, a substrate 505 may be provided, and the temperature indicator 500 may be disposed on or in the substrate 505.

In some examples, the temperature indicator 500 may further include a temperature responsive material 530 and a path 540 for the temperature responsive material 530. In some examples, the path 540 may include a holder portion 542 configured to hold the temperature responsive material 530 and a channel portion 541 through which the temperature responsive material 530 is configured to move. The path 540 may connect the temperature responsive material 530 to the gap 520.

In some examples, the holder portion 542 may be disposed at one end of the path 540. In other examples, the holder portion 542 may be disposed at any other portion of the path 540 (e.g., in the middle portion of the channel portion 541). As shown in FIG. 16, the holder portion 542 (and the temperature responsive material 530) may be disposed inside the capacitor 510/gap 520.

In some examples, a portion of the channel portion 541 may be disposed between the first electrode 511 and the second electrode 512. In some examples, the length D3 of this portion may be at least 50% of the length of the first/second electrode 511/512, for example, at least 60%, at least 70%, at least 80%, at least 90, or at least 100%. In other examples, the length D3 of this portion of the channel portion 541 may be less than 50% of the length of the first/second electrode 511/512, for example, less than 40%, less than 30%, or less than 20%. In some examples, the length D3 of this portion of the channel portion 541 may be in a range of about 0.5 to 3 inches. In other examples, the length D3 of this portion of the channel portion 541 may have any other suitable value (e.g., 0 to 0.5 inches or greater than 3 inches).

In some examples, the temperature responsive material 530 may migrate/diffuse along the path 540 (e.g., the channel portion 541) and away from the gap 520 in response to exposure to a temperature above a threshold temperature. The migration/diffusion of the temperature responsive material 530 away from the gap 520 may cause a change of the capacitance of the capacitor 510. In some examples, at least a predetermined time period of exposure above the threshold temperature is required for the migration of the temperature responsive material 530 to cause the change of the capacitance of the capacitor 510 after an initial exposure to the temperature above the threshold temperature. For example, there may be a change in the capacitance after at least any portion of the temperature responsive material 530 is outside of the gap 520.

Other configurations/features/characteristics of the temperature indicator 500 (e.g., temperature responsive material, filer material, threshold temperature, reversibility, color change, response time, material, size of the components, etc.) may be similar to and/or same as the ones described above with respect to the temperature indicator 100 and, thus, duplicate description may be omitted.

Similar to the temperature indicator 300, in some examples, the temperature indicator 500 may include a plurality of temperature responsive materials (initially disposed inside the gap 520 prior to the exposure to a temperature above the threshold temperature) and paths. In this case, other configurations/features/characteristics of the temperature indicator 500 may be similar to and/or same as the ones described above with respect to the temperature indicator 300 (e.g., other than the structure/location of the temperature responsive materials and paths) and, thus, duplicate description may be omitted.

In some examples, in the temperature indicator 500, the first electrode 511 and the second electrode 512 may be in a comb shape and interleaved with each other, as shown in FIG. 5. In this case, other configurations/features/characteristics of the temperature indicator 500 may be similar to and/or same as the ones described above with respect to the temperature indicator 200 (when there is one temperature responsive material and one path) and/or 400 (when there are multiple temperature responsive materials and multiple paths) and, thus, duplicate description may be omitted.

Figure 17:
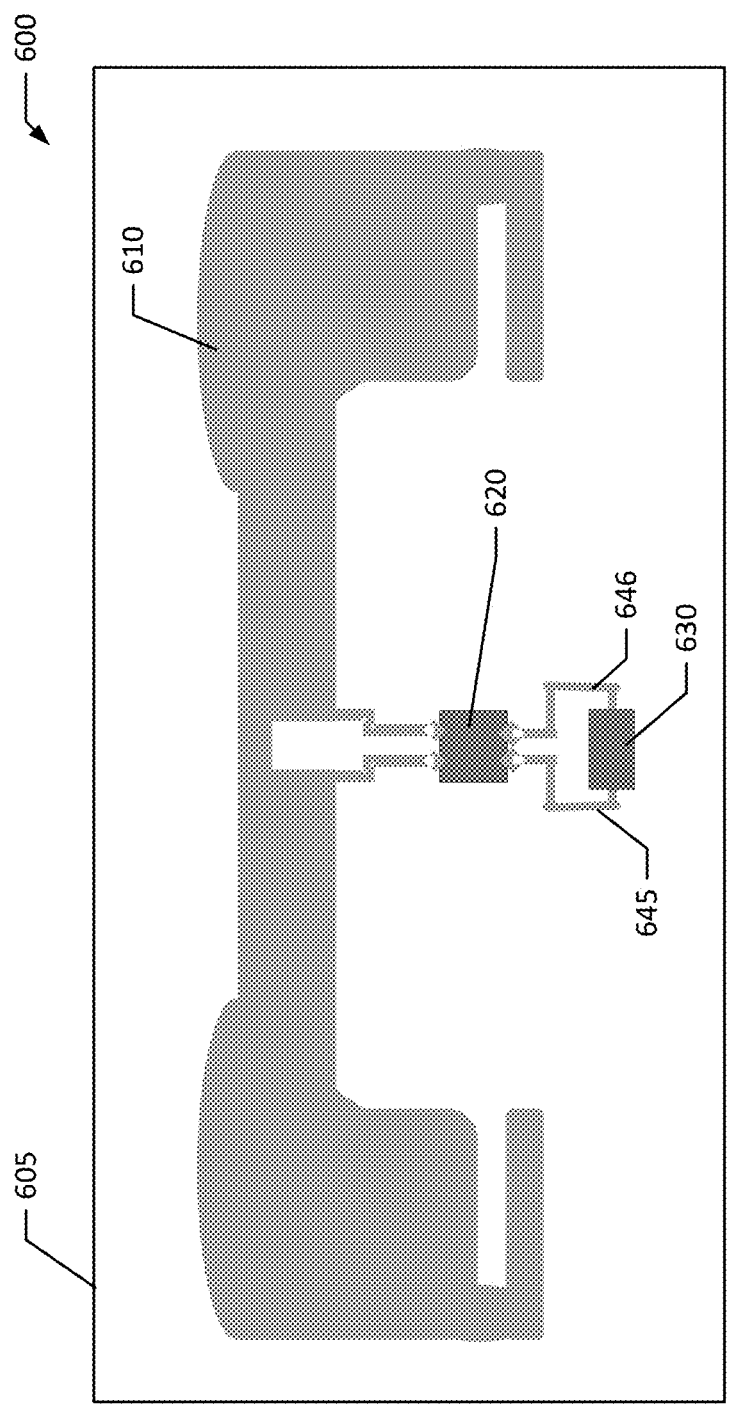
FIG. 17 is a diagram of a radio frequency ID (RFID) tag system according to an example embodiment of the present disclosure.

FIG. 17 illustrates an RFID tag system 600 according to an example embodiment of the present disclosure. The RFID tag system 600 may include an antenna 610, an integrated circuit 620 electrically connected to the antenna 610, and a temperature indicator 630 electrically connected to the integrated circuit 620 and the antenna 610 (e.g., through the integrated circuit 620). The temperature indicator 630 may be one of the temperature indicators described above (e.g., temperature indicator 100, 200, 300, 400, or 500). The RFID tag system 600 may further include a first contact terminal 645 connected to one side of the temperature indicator 630 and a second contact terminal 646 connected to the other side of the temperature indicator 630. The temperature indicator 630 may be connected to the integrated circuit 620 through the first/second contact terminals 645/646. The first/second contact terminals 645/646 may be the first/second contact terminals described above (e.g., first/second contact terminals 145/146, 245/246, 345/346, 445/446, 545/546). The RFID tag system 600 may be configured to change at least one of a frequency response, a resonant frequency, a phase response, a backscatter signal strength, and an antenna gain in response to temperature exposuredependent changes to capacitance of the temperature indicator 630. In some examples, the temperature indicator 630 may be connected to dedicated inputs on the integrated circuit 620 to detect, for example, capacitance value/change of the temperature indicator 630. This capacitance value/change of the temperature indicator 630 may be transmitted by the RFID tag to the reader as data bits (along with Tag ID, etc.). In an alternative embodiment, the capacitor itself may be part of the RFID circuit, changing the frequency response of the RFID when the capacitance changes.

In some examples, the temperature indicator 630 may be fully or partially printed on a rigid or flexible substrate 605, for example, by screen printing, thermal-transfer printing, gravure, flexographic, ink jet, or slot die coating. In other examples, the temperature indicator 630 may be printed using any other suitable methods.

Figure 18:
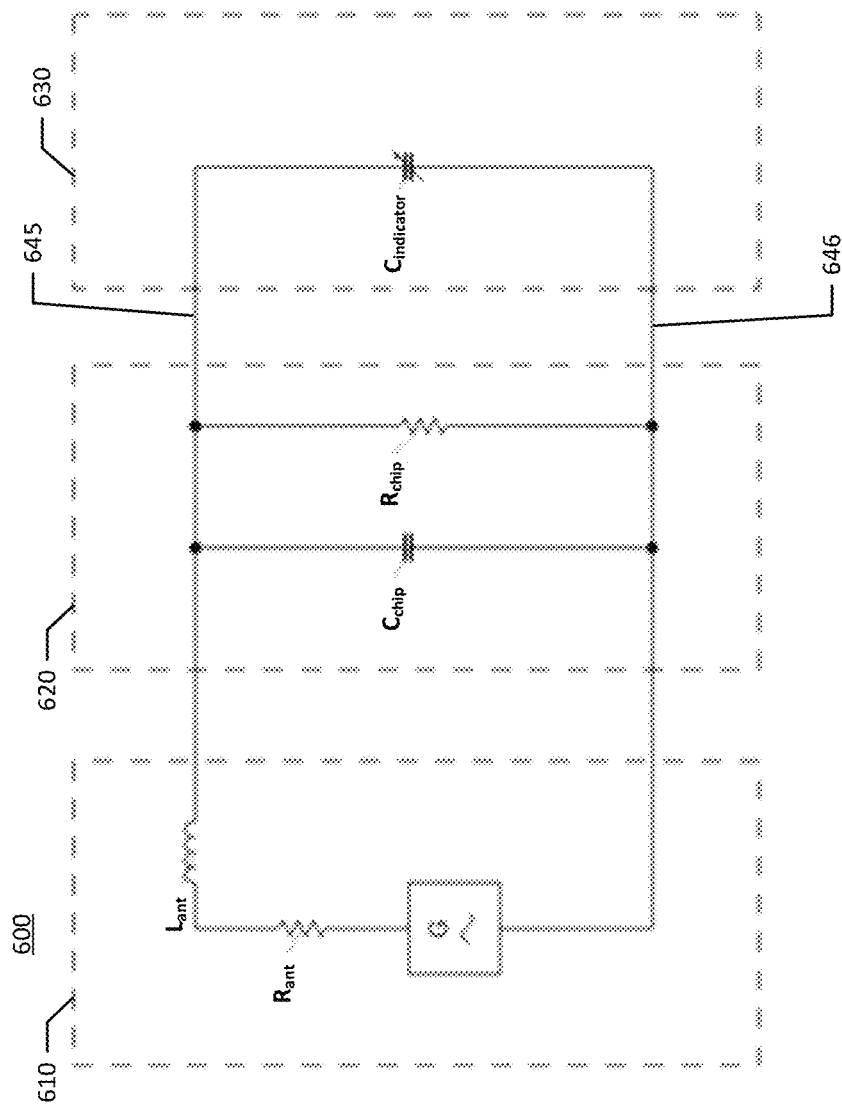
FIG. 18 is a circuit diagram of the RFID tag system of FIG. 17.

FIG. 18 illustrates a circuit diagram of the RFID tag system 600 according to an example embodiment of the present disclosure. As illustrated in FIG. 18 (and FIG. 17), the temperature indicator 630 may be connected to the integrated circuit 620 and the antenna 610 in parallel. The frequency response of the RFID tag system 600 may be changed based on the threshold temperature and response time of the temperature indicator 630. For example, the threshold temperature and response time of the temperature indicator 630 may be based on the temperature responsive material (e.g., temperature responsive material 130, 230, 330, 430, 530) and design of the temperature indicator 630. In some examples, a change in capacitance of the temperature indicator 630 may alter the impedance of the entire circuit in the RFID system 600, thus, changing the frequency response.

In FIG. 18, G may refer to the sinusoidal voltage generated in the RFID tag antenna 610 from a carrier wave transmitted by an RFID reader. $R_{ant}$ may be the resistance of the antenna 610, $L_{ant}$ may be the inductance of the antenna 610, $C_{chip}$ may be the RFID tag's integrated circuit capacitance, $R_{chip}$ may be the RFID tag's integrated circuit resistance, and $C_{indicator}$ may be the tunable/variable capacitance of the temperature indicator 630 that changes, for example, based on the threshold temperature level (and/or the change in dielectric constant) of the dielectric material of the temperature indicator 630. In some examples, the change to the capacitance/resistance is irreversible.

The resonant frequency $f_r$ of the RFID tag system 600 may be expressed as the following equation:

$$f_r = \frac{1}{2\pi\sqrt{L_{ant}(C_{chip} + C_{indicator})}} \quad \text{(Equation 2)}$$

The change in capacitance can be made as large or as small as needed. In some examples, the specific threshold temperature and/or response time at which the change in resonant frequency is required can be designed, for example, based on selecting the appropriate material and structure for building the temperature indicator 630.

In some examples, the integrated circuit 620 may be configured to detect a capacitance value or the change in capacitance of the temperature indicator 630. In some examples, the RFID tag system 600 may further include a memory configured to record information indicating the detected capacitance value/change of the temperature indicator 630. In some examples, the RFID tag system 600 may further include an RFID reader configured to receive a communication from the integrated circuit 620 or the memory indicating the detected capacitance value/change in capacitance of the temperature indicator 630.

The temperature indicators 100-500 and/or the RFID tag system 600 may be used for a temperature-sensitive product having a host product and a container containing the host product. The temperature indicators 100-500 and/or the RFID tag system 600 may be associated with the host product and/or the container to monitor a temperature change and/or an exposure time of the host product/container. For example, the temperature indicators 100-500 and/or the RFID tag system 600 may be attached to the host product and/or the container or at a place near the host product and/or the container. Examples of host products include food stuffs, flowers, concrete, batteries, vaccines, drugs, medication, pharmaceuticals, cosmeceuticals, nutricosmetics, nutritional supplements, biological materials for industrial or therapeutic uses, medical devices, electrical devices, prophylactics, cosmetics, beauty aids, and perishable munitions and ordnance.

In some examples, the capacitance of the temperature indicators 100-500 may be read using a capacitance meter or a multimeter (e.g., BK 878B). In some examples, the temperature indicators 100-500 may be connected to any suitable RFID chips with dedicated inputs to sense capacitance change. In such cases, the change in temperature and/or the exposure time may be detected as a change in capacitance/resistance by the RFID chip and this information can be stored in a user memory and transmitted to an RFID reader.

Figure 19:
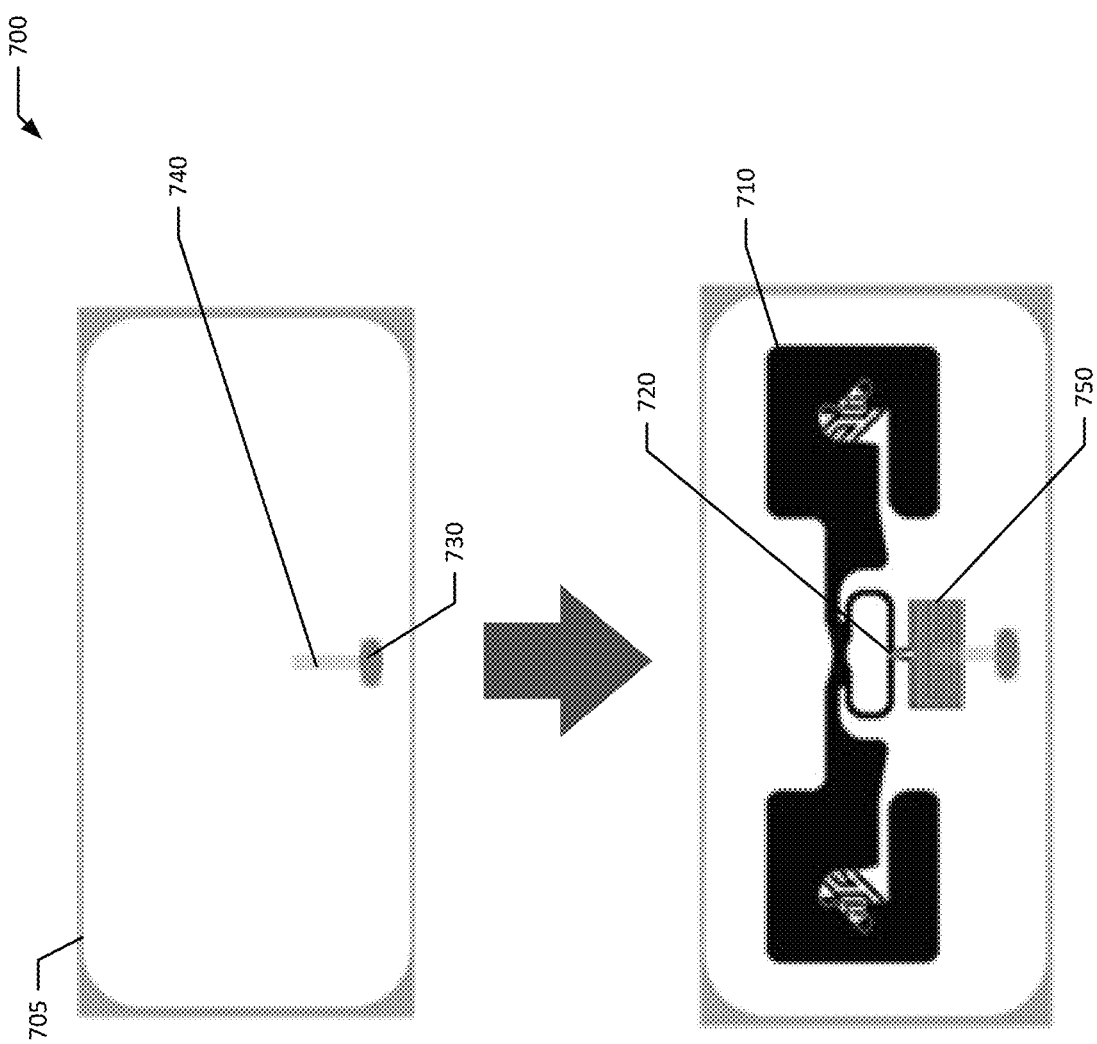
FIG. 19 is an example process of assembling the RFID tag system of FIG. 17.

FIG. 19 illustrates an example process 700 of assembling the RFID tag system of FIG. 17. As shown in FIG. 19, a substrate 705 may be provided. On the substrate 705, a temperature responsive material 730 and a path 740 may be provided. Then, an RFID inlay may be placed over the path 740. The RFID inlay may include an antenna 710, an integrated circuit 720, and a capacitor 750 (e.g., capacitors 110, 210, 310, 410, or 510). In this case, the temperature indicator in the RFID system may have a structure shown in FIG. 5, 6A, 6B, 6C, 7, 8A, 8B, or 8C.

In some examples, the RFID inlay may be provided/formed on the substrate 705 first and, then, the path 740 (and the temperature responsive material 730) may be provided on the substrate 705, for example, over the RFID inlay. In this case, the temperature indicator in the RFID system may have a structure shown in FIG. 9, 10A, 10B, 11, 12A, or 12B.

EXAMPLES

Example 1

An example of change in the resonant frequency of the RFID tag system 600 may be shown in Table 1 below. In this example, the temperature indicator of the RFID tag system 600 may include a first threshold temperature (35° C.) (of a first temperature responsive material 330-1/430-1), a second threshold temperature (50° C.) (of a second temperature responsive material 330-2/430-2), and a third threshold temperature (65° C.) (of a third temperature responsive material 330-3/430-3). Here, it is assumed that each of the temperature responsive materials was exposed to the respective threshold temperature for more than the respective response time. In this example, the temperature indicator of the RFID tag system 600 may have a structure similar to the temperature indicator 300 or 400.

TABLE 1

First example of change in resonant frequency of RFID tag system in response to temperature changes

| Antenna Inductance (nH) | Chip Capacitance (pF) | Total Capacitance of Temperature Indicator (pF) | Resonant Frequency (MHz) | Temperature (° C.) | Comments |
|---|---|---|---|---|---|
| 25 | 1.1 | 3 | 920 | <35 | Temperature indicator not activated below 35° C. |
| 25 | 1.1 | 5 | 915 | Around 35 or above | Temperature indicator activated at first threshold temperature of 35° C. |
| 25 | 1.1 | 10 | 905 | Around 50 or above | Temperature indicator activated at second threshold temperature of 50° C. |
| 25 | 1.1 | 15 | 900 | Around 65 or above | Temperature indicator activated at third threshold temperature of 65° C. |

As shown in the table above, the total capacitance of the temperature indicator may change from 3 to 5 pF after exposure to the temperature around or above the first threshold temperature (35° C.), from 5 to 10 pF after exposure to the temperature around or above the second threshold temperature (50° C.), and from 10 to 15 pF after exposure to the temperature around or above the third threshold temperature (65° C.).

Example 2

Another example of change in the resonant frequency of the RFID tag system 600 may be shown in Table 2 below. In this example, the temperature indicator of the RFID tag system 600 may include a first threshold temperature (35° C.) (of a first temperature responsive material), a second threshold temperature (50° C.) (of a second temperature responsive material), and a third threshold temperature (65° C.) (of a third temperature responsive material). Here, it is assumed that each of the temperature responsive materials was exposed to the respective threshold temperature for more than the respective response time. In this example, the temperature indicator of the RFID tag system 600 may have a structure similar to the temperature indicator 500 when it has multiple temperature responsive materials (initially located inside the gap 520 prior to the exposure to a temperature above the respective threshold temperature) and paths.

TABLE 2

Second example of change in resonant frequency of RFID tag system in response to temperature changes

| Antenna Inductance (nH) | Chip Capacitance (pF) | Total Capacitance of Temperature Indicator (pF) | Resonant Frequency (MHz) | Temperature (° C.) | Comments |
|---|---|---|---|---|---|
| 25 | 1.1 | 15 | 900 | <35 | Base capacitance value of temperature indicator below 35° C. |
| 25 | 1.1 | 12 | 905 | Around 35 or above | Temperature indicator activated at first threshold temperature of 35° C. |
| 25 | 1.1 | 9 | 915 | Around 50 or above | Temperature indicator activated at second threshold temperature of 50° C. |
| 25 | 1.1 | 6 | 920 | Around 65 or above | Temperature indicator activated at third threshold temperature of 65° C. |

As shown in the table above, the total capacitance of the temperature indicator may change from 15 to 12 pF after exposure to the temperature around or above the first threshold temperature (35° C.), from 12 to 9 pF after exposure to the temperature around or above the second threshold temperature (50° C.), and from 9 to 6 pF after exposure to the temperature around or above the third threshold temperature (65° C.).

EMBODIMENTS

Various aspects of the subject matter described herein are set out in the following numbered embodiments:

Embodiment 1. A temperature indicator comprises a first temperature responsive material; a capacitor comprising: a first electrode; a second electrode; and a gap between the first electrode and the second electrode, and a first path connecting the first temperature responsive material to the gap, wherein the first temperature responsive material is configured to migrate along the first path and into or along the gap in response to exposure to a temperature above a first threshold temperature, the migration of the first temperature responsive material into or along the gap causing a change of the capacitance of the capacitor.

Embodiment 2. The temperature indicator of embodiment 1, wherein at least a first predetermined time period of exposure above the first threshold temperature is required for the migration of the first temperature responsive material to cause the change of the capacitance of the capacitor after an initial exposure to the temperature above the first threshold temperature.

Embodiment 3. The temperature indicator of embodiments 1-2, wherein the first temperature responsive material is disposed at a first predetermined distance away from the capacitor and configured to start moving along the first path toward the capacitor when exposed to the temperature above the first threshold temperature.

Embodiment 4. The temperature indicator of embodiments 2-3, wherein the first predetermined time period is in a range of about 30 minutes to about 60 minutes.

Embodiment 5. The temperature indicator of embodiment 2-3, wherein the first predetermined time period is in a range of about 20 hours to about 24 hours.

Embodiment 6. The temperature indicator of embodiments 2-5, wherein there is no change of the capacitance of the capacitor when the temperature indicator is exposed to the temperature above the first threshold temperature less than the first predetermined time period.

Embodiment 7. The temperature indicator of embodiments 1-6, wherein the first temperature responsive material comprises a solid with a melting point at or around the first threshold temperature, a viscous material whose viscosity is low enough to prevent flow along the first path below the first threshold temperature, but whose viscosity allows flow along the first path above the first threshold temperature, or a material selected from the group consisting of alkane wax, fatty acid, ester, long-chain alkylated derivatives, side-chain crystalline polymer, acrylic-based polymer, and combinations thereof.

Embodiment 8. The temperature indicator of embodiments 1-7, wherein the first threshold temperature is in a range of about 27.5° C. to about 32.5° C.

Embodiment 9. The temperature indicator of embodiments 1-8, further comprises: a second temperature responsive material; and a second path connecting the second temperature responsive material to the gap, wherein the second temperature responsive material is configured to migrate along the second path and into or along the gap in response to exposure to a temperature above a second threshold temperature, the migration of the second temperature responsive material into or along the gap causing a further change of the capacitance of the capacitor.

Embodiment 10. The temperature indicator of embodiment 9, wherein the second temperature responsive material is disposed at a second predetermined distance away from the capacitor and configured to start moving along the second path toward the capacitor when exposed to the temperature above the second threshold temperature.

Embodiment 11. The temperature indicator of embodiments 9-10, wherein the second threshold temperature is greater than the first threshold temperature.

Embodiment 12. The temperature indicator of embodiments 9-11, wherein the second threshold temperature is in a range of about 42.5° C. to about 47.5° C.

Embodiment 13. The temperature indicator of embodiments 9-12, further comprises: a third temperature responsive material; and a third path connecting the third temperature responsive material to the gap, wherein the third temperature responsive material is configured to migrate along the third path and into or along the gap in response to exposure to a temperature above a third threshold temperature, the migration of the third temperature responsive material into or along the gap causing a further change of the capacitance of the capacitor.

Embodiment 14. The temperature indicator of embodiment 13, wherein the third temperature responsive material is disposed at a third predetermined distance away from the capacitor and configured to start moving along the third path toward the capacitor when exposed to the temperature above the third threshold temperature.

Embodiment 15. The temperature indicator of embodiments 13-14, wherein the third threshold temperature is greater than the first and second threshold temperatures.

Embodiment 16. The temperature indicator of embodiments 13-15, wherein the third threshold temperature is in a range of about 57.5° C. to about 62.5° C.

Embodiment 17. The temperature indicator of embodiments 1-16, wherein the first electrode and the second electrode are in a comb shape and interleaved with each other.

Embodiment 18. The temperature indicator of embodiments 1-17, further comprises a substrate on or in which the first temperature responsive material, the capacitor, and the first path are disposed, wherein the substrate comprises a paper.

Embodiment 19. A temperature indicator comprises: a first temperature responsive material; a capacitor comprising: a first electrode; a second electrode; and a gap between the first electrode and the second electrode, and a first path, wherein the first temperature responsive material is configured to migrate along the first path and away from the gap in response to exposure to a temperature above a first threshold temperature, the migration of the first temperature responsive material away from the gap causing a change of the capacitance of the capacitor.

Embodiment 20. The temperature indicator of embodiment 19, wherein the first temperature responsive material comprises a solid with a melting point at or around the first threshold temperature, a viscous material whose viscosity is low enough to prevent flow along the first path below the first threshold temperature, but whose viscosity allows flow along the first path above the first threshold temperature, or a material selected from the group consisting of alkane wax, fatty acid, ester, long-chain alkylated derivatives, side-chain crystalline polymer, acrylic-based polymer and combinations thereof.

Embodiment 21. The temperature indicator of embodiments 19-20, wherein the first threshold temperature is in a range of about 27.5° C. to about 32.5° C.

Embodiment 22. The temperature indicator of embodiments 19-21, further comprises: a second temperature responsive material; and a second path, wherein the second temperature responsive material is configured to migrate along the second path and away from the gap in response to exposure to a temperature above a second threshold temperature, the migration of the second temperature responsive material away from the gap causing a further change of the capacitance of the capacitor.

Embodiment 23. The temperature indicator of embodiment 22, wherein the second threshold temperature is greater than the first threshold temperature.

Embodiment 24. The temperature indicator of embodiments 22-23, wherein the second threshold temperature is in a range of about 42.5° C. to about 47.5° C.

Embodiment 25. The temperature indicator of embodiments 22-24, further comprises: a third temperature responsive material; and a third path, wherein the third temperature responsive material is configured to migrate along the third path and away from the gap in response to exposure to a temperature above a third threshold temperature, the migration of the third temperature responsive material away from the gap causing a further change of the capacitance of the capacitor.

Embodiment 26. The temperature indicator of embodiment 25, wherein the third threshold temperature is greater than the first and second threshold temperatures.

Embodiment 27. The temperature indicator of embodiments 25-26, wherein the third threshold temperature is in a range of about 57.5° C. to about 62.5° C.

Embodiment 28. The temperature indicator of embodiments 19-27, wherein the first electrode and the second electrode are in a comb shape and interleaved with each other.

Embodiment 29. The temperature indicator of embodiments 19-28, further comprises a substrate on or in which the first temperature responsive material, the capacitor, and the first path are disposed, wherein the substrate comprises a paper.

Embodiment 30. An RFID tag comprises: an antenna; an integrated circuit electrically connected to the antenna; and the temperature indicator of any one of embodiments 1-29, wherein the temperature indicator is electrically connected to the antenna and the integrated circuit, wherein the integrated circuit is configured to detect, via the antenna, a capacitance value or the change in capacitance of the temperature indicator.

Embodiment 31. The RFID tag of embodiment 30, wherein the RFID tag is configured to change at least one of a frequency response, a resonant frequency, a phase response, a backscatter signal strength, and an antenna gain in response to the change of the capacitance of the capacitor.

Embodiment 32. The RFID tag of embodiments 30-31, further comprises a memory configured to record information indicating the detected change in capacitance of the temperature indicator.

Embodiment 33. The RFID tag of embodiment 32, wherein the integrated circuit or the memory is configured to transmit a communication to an RFID reader via the antenna, indicating the detected change in capacitance of the temperature indicator.

Embodiment 34. The RFID tag of embodiment 33, wherein the integrated circuit is configured to transmit a notification to the RFID reader via the antenna in response to detecting a capacitance value of the temperature indicator equal to or greater than a first threshold capacitance value.

Embodiment 35. A temperature sensitive product, comprises: a host product; and the temperature indicator of any one of embodiments 1-29 or the RFID tag of any one of embodiments 30-34, wherein the temperature indicator is associated with the host product to monitor the change in temperature of the host product.

Embodiment 36. The temperature sensitive product of embodiment 35, wherein the host product comprises a product selected from the group consisting of food stuffs, flowers, concrete, batteries, vaccines, drugs, medication, pharmaceuticals, cosmeceuticals, nutricosmetics, nutritional supplements, biological materials for industrial or therapeutic uses, medical devices, electrical devices, prophylactics, cosmetics, beauty aids, and perishable munitions and ordnance.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

Reference throughout the specification to "various aspects," "some aspects," "some examples," "other examples," "some cases," or "one aspect" means that a particular feature, structure, or characteristic described in connection with the aspect is included in at least one example. Thus, appearances of the phrases "in various aspects," "in some aspects," "certain embodiments," "some examples," "other examples," "certain other embodiments," "some cases," or "in one aspect" in places throughout the specification are not necessarily all referring to the same aspect. Furthermore, the particular features, structures, or characteristics illustrated or described in connection with one example may be combined, in whole or in part, with features, structures, or characteristics of one or more other aspects without limitation.

When the position relation between two parts is described using the terms such as "on," "above," "below," "under," and "next," one or more parts may be positioned between the two parts unless the terms are used with the term "immediately" or "directly." Similarly, as used herein, the terms "attachable," "attached," "connectable," "connected," or any similar terms may include directly or indirectly attachable, directly or indirectly attached, directly or indirectly connectable, and directly or indirectly connected.

It is to be understood that at least some of the figures and descriptions herein have been simplified to illustrate elements that are relevant for a clear understanding of the disclosure, while eliminating, for purposes of clarity, other elements. Those of ordinary skill in the art will recognize, however, that these and other elements may be desirable. However, because such elements are well known in the art, and because they do not facilitate a better understanding of the disclosure, a discussion of such elements is not provided herein.

The terminology used herein is intended to describe particular embodiments only and is not intended to be limiting of the present disclosure. As used herein, the singular forms "a," "an," and "the" are intended to include the plural forms as well, unless otherwise indicated. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "at least one of X or Y" or "at least one of X and Y" should be interpreted as X, or Y, or X and Y.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A temperature indicator comprising:
    a first temperature responsive material;
    a second temperature responsive material;
    a capacitor comprising:
        a first electrode,
        a second electrode, and
        a gap between the first electrode and the second electrode;
    a first path connecting the first temperature responsive material to the gap; and
    a second path connecting the second temperature responsive material to the gap,
    wherein the first temperature responsive material is configured to migrate along the first path and into or along the gap in response to exposure to a temperature above a first threshold temperature, the migration of the first temperature responsive material into or along the gap causing a first change of a capacitance of the capacitor, and wherein the second temperature responsive material is configured to migrate along the second path and into or along the gap in response to exposure to a second temperature above a second threshold temperature, the migration of the second temperature responsive material into or along the gap causing a second change of the capacitance of the capacitor, the capacitance of the capacitor after the the second change being different from the capacitance of the capacitor after the first change.

2. The temperature indicator of claim 1, wherein at least a first predetermined time period of exposure above the first threshold temperature is required for the migration of the first temperature responsive material to cause the first change of the capacitance of the capacitor after an initial exposure to the temperature above the first threshold temperature, and wherein at least a second predetermined time period of exposure above the second threshold temperature is required for the migration of the second temperature responsive material to cause the second change of the capacitance of the capacitor after an initial exposure to the temperature above the second threshold temperature.

3. The temperature indicator of claim 2, wherein the first temperature responsive material is disposed at a first predetermined distance away from the capacitor and configured to start moving along the first path toward the capacitor when exposed to the temperature above the first threshold temperature, and wherein the second temperature responsive material is disposed at a second predetermined distance away from the capacitor and configured to start moving along the second path toward the capacitor when exposed to the temperature above the second threshold temperature.

4. The temperature indicator of claim 2, wherein the first predetermined time period is in a range of 30 minutes to 60 minutes.

5. The temperature indicator of claim 2, wherein the first change of the capacitance of the capacitor does not occur when the temperature indicator is exposed to the temperature above the first threshold temperature less than the first predetermined time period, and wherein the second change of the capacitance of the capacitor does not occur when the temperature indicator is exposed to the temperature above the second threshold temperature less than the second predetermined time period.

6. The temperature indicator of claim 1, wherein the first temperature responsive material comprises a material selected from the group consisting of alkane wax, fatty acid, ester, long-chain alkylated derivatives, side-chain crystalline polymer, acrylic-based polymer, and combinations thereof.

7. The temperature indicator of claim 1, wherein the second threshold temperature is higher than the first threshold temperature.

8. The temperature indicator of claim 3, wherein the second predetermined distance is longer than the first predetermined distance.

9. The temperature indicator of claim 8, wherein the second threshold temperature is greater than the first threshold temperature.

10. The temperature indicator of claim 1, wherein the first electrode and the second electrode are in a comb shape and interleaved with each other.

11. The temperature indicator of claim 1, further comprising a substrate on or in which the first temperature responsive material, the capacitor, and the first path are disposed, wherein the substrate comprises a paper.

12. A temperature indicator comprising:
a first temperature responsive material;
a second temperature responsive material;
a capacitor comprising:
 a first electrode,
 a second electrode, and
 a gap between the first electrode and the second electrode;
a first path; and
a second path,
wherein the first temperature responsive material is configured to migrate along the first path and away from the gap in response to exposure to a temperature above a first threshold temperature, the migration of the first temperature responsive material away from the gap causing a first change of a capacitance of the capacitor, and wherein the second temperature responsive material is configured to migrate along the second path and away from the gap in response to exposure to a temperature above a second threshold temperature, the migration of the second temperature responsive material causing a second change of the capacitance of the capacitor, different than the first change.

13. The temperature indicator of claim 12, wherein the first temperature responsive material comprises a material selected from the group consisting of alkane wax, fatty acid, ester, long-chain alkylated derivatives, side-chain crystalline polymer, acrylic-based polymer and combinations thereof.

14. The temperature indicator of claim 12, wherein the second threshold temperature is greater than the first threshold temperature.

15. The temperature indicator of claim 12, further comprising a substrate on or in which the first temperature responsive material, the second temperature responsive material, the capacitor, the first path, and the second path are disposed, wherein the substrate comprises a paper.

16. An RFID tag comprising:
an antenna;
an integrated circuit electrically connected to the antenna; and
the temperature indicator of claim 1, wherein the temperature indicator is electrically connected to the antenna and the integrated circuit.

17. The RFID tag of claim 16, wherein the RFID tag is configured to change at least one of a frequency response, a resonant frequency, a phase response, a backscatter signal strength, and an antenna gain in response to the first and second changes of the capacitance of the capacitor.

18. The temperature indicator of claim 8, wherein the second temperature threshold is the same as the first temperature threshold.

19. The temperature indicator of claim 3, wherein the second predetermined distance is shorter than the first predetermined distance and wherein the second threshold temperature is higher than the first threshold temperature.

20. The temperature indicator of claim 2, wherein the second predetermined time is longer than the first predetermined time, and wherein the second path has a different width than the first path.

21. The temperature indicator of claim 1, wherein the first indicator material is a viscous material which, below the first threshold temperature, has a viscosity high enough to prevent flow of the first indicator material along the first path, and a viscosity above the first threshold temperature which is low enough to allow flow of the first indicator material along the first path.

22. The temperature indicator of claim 12, wherein the first temperature responsive material is configured to migrate along the first path by diffusion.

23. The temperature indicator of claim 22, wherein the first path is along a wick.

24. The temperature indicator of claim 12, wherein the first temperature responsive material is configured to change viscosity responsive to the temperature above the first threshold, causing the material to flow away from gap along the first path.

25. The RFID tag of claim 16, wherein the integrated circuit is configured to change a digital output via the antenna of the RFID tag responsive to the first and second changes of capacitance.

26. The temperature indicator of claim 1, wherein the first and second materials have different compositions.

* * * * *